(12) United States Patent
Paino et al.

(10) Patent No.: US 10,800,437 B2
(45) Date of Patent: Oct. 13, 2020

(54) WHEELBARROW

(71) Applicant: MSP INNOVATIONS PTY LTD, Victoria (AU)

(72) Inventors: Michael Paino, Victoria (AU); Paul Edward Davies, Victoria (AU)

(73) Assignee: MSP Innovations Pty Ltd., Essendon (AU)

( * ) Notice: Subject to any disclaimer, the term of this patent is extended or adjusted under 35 U.S.C. 154(b) by 0 days.

(21) Appl. No.: 15/754,873

(22) PCT Filed: Aug. 24, 2016

(86) PCT No.: PCT/AU2016/050779
§ 371 (c)(1),
(2) Date: Feb. 23, 2018

(87) PCT Pub. No.: WO2017/031538
PCT Pub. Date: Mar. 2, 2017

(65) Prior Publication Data
US 2018/0257686 A1 Sep. 13, 2018

(30) Foreign Application Priority Data

Aug. 25, 2015 (AU) .................. 2015903434

(51) Int. Cl.
*B62B 1/00* (2006.01)
*B62B 1/20* (2006.01)
(Continued)

(52) U.S. Cl.
CPC ................ *B62B 1/202* (2013.01); *B62B 1/22* (2013.01); *B62B 1/26* (2013.01); *B62B 5/06* (2013.01);
(Continued)

(58) Field of Classification Search
CPC .. B62B 1/202; B62B 1/26; B62B 1/22; B62B 5/06
See application file for complete search history.

(56) References Cited

U.S. PATENT DOCUMENTS 355,263 A * 12/1886 Gourlay .................. B62B 1/264
414/450
1,479,223 A * 1/1924 Carroll ..................... B62B 1/18
147/48
(Continued)

FOREIGN PATENT DOCUMENTS

| GB | 2 488 324 A | 8/2012 |
|---|---|---|
| WO | 2014078888 A1 | 5/2014 |

OTHER PUBLICATIONS

Australian Patent Office International Search Report dated Oct. 2, 2015.
(Continued)

*Primary Examiner* — Hau V Phan
(74) *Attorney, Agent, or Firm* — Woodard, Emhardt, Henry, Reeves & Wagner, LLP

(57) ABSTRACT

A wheelbarrow (10) including a receptacle (12) comprising a tub for carrying a load of material; a wheel assembly facilitating movement of the wheelbarrow; a handle for controlling operation of the wheelbarrow; and a plurality of removable compartments (18, 19) located within the receptacle (12), each for containing a portion of the load of material. The receptacle (12) and each removable compartment (18, 19) are configured to interact with each other so as to, in use, hinder movement of each comportment (18, 19) relative to the receptacle (12).

20 Claims, 12 Drawing Sheets

(51) Int. Cl.
    *B62B 1/26*     (2006.01)
    *B62B 1/22*     (2006.01)
    *B62B 5/06*     (2006.01)
    *B62B 3/14*     (2006.01)

(52) U.S. Cl.
    CPC ............ *B62B 1/204* (2013.01); *B62B 3/1464* (2013.01); *B62B 2202/12* (2013.01)

(56) References Cited

U.S. PATENT DOCUMENTS

| | | | | |
|---|---|---|---|---|
| D231,722 S * | 6/1974 | Mockler | ........................... | D34/5 |
| 4,607,856 A * | 8/1986 | Saleeba | ..................... | B62B 1/20 |
| | | | | 182/33 |
| 5,154,359 A * | 10/1992 | Junta | ....................... | B62B 3/106 |
| | | | | 211/12 |
| 5,222,853 A * | 6/1993 | Carson | .................... | B65F 1/004 |
| | | | | 414/408 |
| 5,375,860 A * | 12/1994 | Ernsberger | ................ | B62B 3/00 |
| | | | | 220/909 |
| 5,400,916 A * | 3/1995 | Weber | .................... | B44D 3/126 |
| | | | | 15/257.05 |
| 5,601,298 A | 2/1997 | Watanabe | | |
| 5,662,235 A * | 9/1997 | Nieto | ..................... | B65F 1/085 |
| | | | | 220/23.86 |
| 5,791,667 A | 8/1998 | Knoll | | |
| 6,203,033 B1 | 3/2001 | Knoll | | |
| 7,066,477 B2 * | 6/2006 | Dubois | ..................... | B62B 3/04 |
| | | | | 280/166 |
| 7,384,051 B1 | 6/2008 | Haire | ..................... | A01K 97/05 |
| | | | | 280/47.34 |
| 7,815,215 B1 * | 10/2010 | Lowe | ..................... | B62B 3/025 |
| | | | | 280/47.18 |
| 7,954,830 B2 * | 6/2011 | Begin | ...................... | B62B 3/04 |
| | | | | 280/47.35 |
| 8,069,939 B1 * | 12/2011 | Metzler | .................... | B62B 3/02 |
| | | | | 180/19.1 |
| 8,381,931 B1 * | 2/2013 | Ernest, III | ................ | B62B 3/10 |
| | | | | 206/518 |
| 8,517,402 B2 | 8/2013 | Davis | | |
| 8,534,681 B2 * | 9/2013 | Tomsha | .................... | B62B 1/18 |
| | | | | 280/47.131 |
| 8,550,284 B1 * | 10/2013 | Morad | .................. | B65F 1/1473 |
| | | | | 220/262 |
| 9,415,785 B2 * | 8/2016 | Cooke | ....................... | B62B 1/18 |
| 9,457,823 B2 * | 10/2016 | Higbe | ...................... | B62B 1/264 |
| 9,499,391 B1 * | 11/2016 | Douglas | ................... | B62B 3/007 |
| D822,303 S * | 7/2018 | Paino | ............................ | D34/16 |
| 2002/0117818 A1 * | 8/2002 | Barnes | ..................... | A01K 5/00 |
| | | | | 280/47.26 |
| 2003/0201616 A1 * | 10/2003 | Friel | ......................... | B62B 1/20 |
| | | | | 280/47.31 |
| 2006/0091625 A1 * | 5/2006 | Naude, Jr. | ............... | B62B 3/022 |
| | | | | 280/33.991 |
| 2007/0039986 A1 | 2/2007 | Tomasi | | |
| 2007/0068942 A1 * | 3/2007 | Smudde | ..................... | B65F 1/141 |
| | | | | 220/23.86 |
| 2007/0096437 A1 * | 5/2007 | Watson | .................... | B62B 3/027 |
| | | | | 280/651 |
| 2008/0185802 A1 * | 8/2008 | Fleming | .................... | B62B 1/22 |
| | | | | 280/47.18 |
| 2009/0206569 A1 * | 8/2009 | Begin | ....................... | B62B 3/04 |
| | | | | 280/47.35 |
| 2009/0230644 A1 | 9/2009 | Stanley | | |
| 2010/0127028 A1 | 5/2010 | Lusk | | |
| 2014/0041298 A1 * | 2/2014 | Mack | ...................... | A01G 9/02 |
| | | | | 47/66.6 |
| 2014/0231164 A1 | 8/2014 | Michel, Jr. | | |
| 2015/0001267 A1 * | 1/2015 | Thorsen | ................... | B62B 1/204 |
| | | | | 224/401 |
| 2015/0076199 A1 | 3/2015 | Granvle | | |
| 2015/0329131 A1 * | 11/2015 | Dumas | ..................... | B62B 1/202 |
| | | | | 280/47.31 |
| 2016/0082995 A1 * | 3/2016 | Higbe | ..................... | B62B 1/264 |
| | | | | 280/47.19 |
| 2017/0057079 A1 * | 3/2017 | Thorsen | ................... | B25H 5/00 |
| 2018/0029622 A1 * | 2/2018 | Stuart | ..................... | B25H 3/06 |

OTHER PUBLICATIONS

Australian Patent Office Written Opinion dated Oct. 2, 2015.
Communication Extended European Search Report dated Mar. 13, 2019 in connection with European Patent Application No. 16838123.4.

* cited by examiner

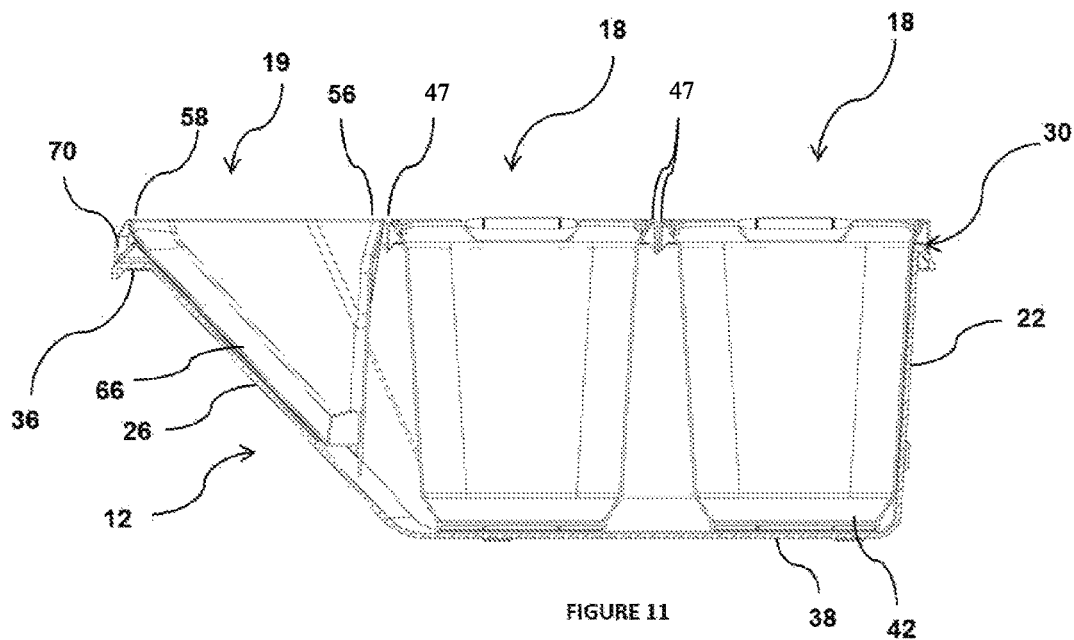
FIGURE 11
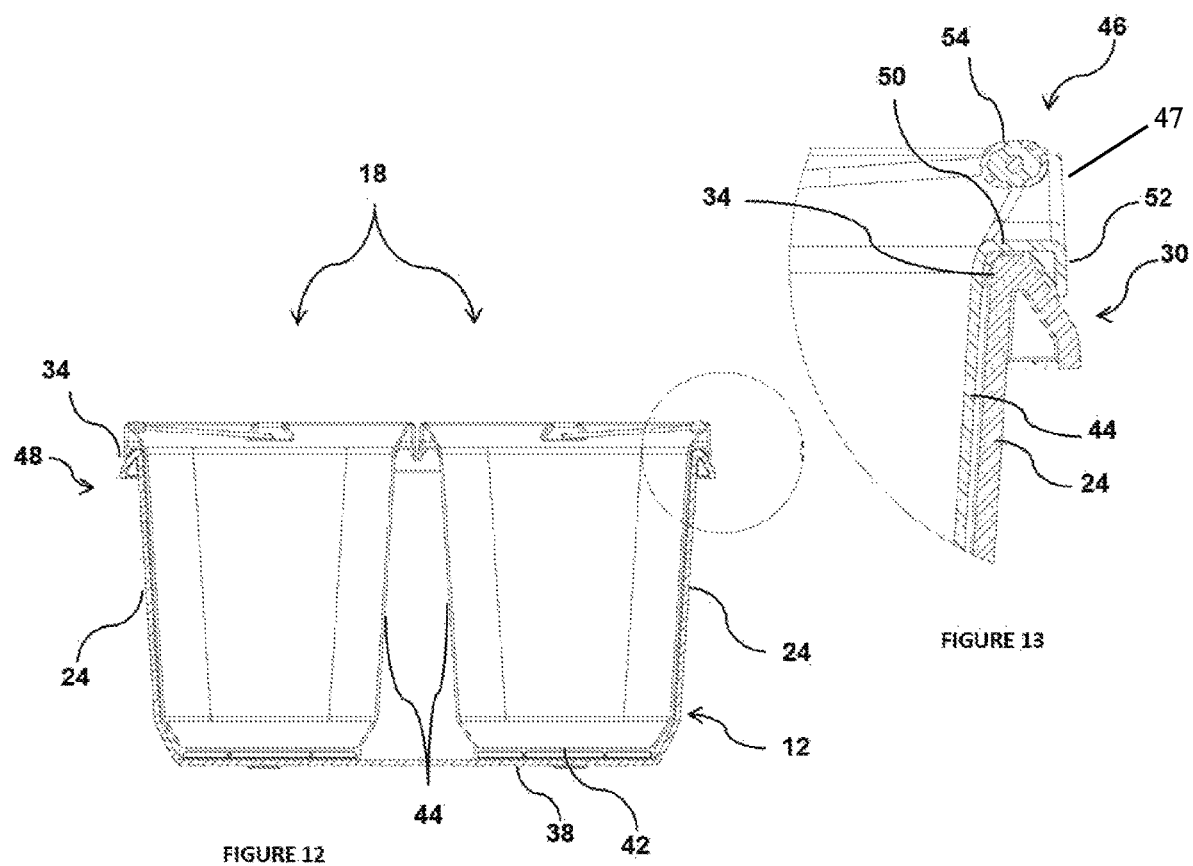
FIGURE 12
FIGURE 13

WHEELBARROW

TECHNICAL FIELD

The present invention relates generally to a wheelbarrow. In particular, the invention has been developed for use as a manually operated wheelbarrow and will hereinafter generally be described in this context. However, it is to be appreciated that the invention is not necessarily limited to this application and may also relate, for example, to powered wheelbarrows or other types of load carrying trolleys and carts in the field of wheelbarrows.

BACKGROUND OF INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Conventional wheelbarrows provide a convenient means by which a relatively large volume of material, typically 60-200 litres, can be manually transported to a desired location. The wide variety of wheelbarrow applications will be generally appreciated and include commercial applications such as construction or landscaping as well as a variety of domestic applications such as gardening or the transport of rubbish. In addition to facilitating the transport of solid materials, some wheelbarrows may also be used to transport liquids, for example, water or un-cured concrete.

As foreshadowed above, wheelbarrows may be manually operated or powered. Manually operated wheelbarrows will typically include a load carrying tub positioned between a pair of handles and a single load-bearing wheel. In operation, the handles are manually raised and a portion of the tub load is shifted onto the wheel, allowing relative heavy loads to be transported by a single operator. Alternatively, automatic or powered wheelbarrows will typically include a tub mounted upon one, two, three or four wheels and including a motor to assist in moving heavier loads that are unsuitable or unsafe for transport with a manually operated wheelbarrow. Certain types of powered wheelbarrow may include a pair of continuous tracks (also known as caterpillar tracks) providing improved traction on steep or muddy surfaces.

When the material intended for transport comprises larger discrete articles, for example items of rubbish, a wheelbarrow tub will typically be filled by manually placing items of material into the tub. Alternatively, where the material is granular, for example soil or crushed rock, then a shovel or other hand-tool may be used to assist in the filling process. After transport to the desired emptying location, some (but not all) manually operated wheelbarrows may be upended to empty the tub or manually emptied by hand or with a hand-tool. Powered wheelbarrows can, in some instances, be manually upended can also include a 'tipping' or 'dumping' mechanism whereby the tub is inclined in order to tip out the tub contents at the desired location.

In order to eliminate undesirable manual handling of the tub material, it is desirable for conventional wheelbarrows (manual or powered) to be moved as close as possible to the filling and emptying locations. However, in practice, an operator may encounter a variety of obstacles or hazards which prevents or limits access of the wheelbarrow to the desired position. In this regard, obstacles such as stairs, uneven terrain or muddied ground may be difficult, unsafe or impossible to traverse with a filled wheelbarrow tub and particularly if the operator is alone. In these circumstances, it may be necessary for the wheelbarrow to be stopped short of the filling or emptying location and for the tub material to be manually carried the remainder distance to the destination. Moreover, in instances where the filling or emptying location is elevated, for example a skip bin or a utility vehicle tray, it may be impossible for a loaded wheelbarrow to be lifted to the necessary elevation in order for tipping/emptying to occur.

In an attempt to address the above difficulties, wheelbarrow operators will frequently use timber planks as crude ramps to traverse stairs or to obtain access to an elevated vehicle tray. This practice, however, is highly dangerous in that a loaded wheelbarrow, often weighing in excess of 150 kg, must be pushed up a narrow ramp at the risk of falling backwards or sideways, in either case potentially falling onto the operator causing injury, damaging the vehicle and spilling the load.

Another example of undesirable, yet common, wheelbarrow practice involves a pair of operators lifting loaded wheelbarrows up stairs or above their heads to empty the wheelbarrow contents into a skip bin. This practice places the operators at high risk of injury or strain from the lift and an even greater risk of injury in the event that the wheelbarrow or the material within is accidently dropped onto one of the operators.

Furthermore, the practice of lifting a loaded wheelbarrow up stairs or pushing a loaded wheelbarrow up a makeshift ramp markedly increases the chance of spillage occurring thereby resulting in a waste of materials and a time consuming mess to be cleaned up. Moreover, these practices usually require additional operators to suspend their activities to help the primary operator push or lift the wheelbarrow, thus reducing overall efficiency at the work site.

In view of the above problems, tradespeople have resorted to carrying 20 litre cylindrical buckets or similar containers inside wheelbarrows to assist in moving building materials and/or rubble to and from work sites. Utilising 20 litre buckets allows for manual handling of smaller portions of material mass however the cylindrical buckets are haphazardly arranged within a wheelbarrow tub and buckets are unsecured against toppling over within the tub or even falling out of the tub if they are stacked sufficiently high. Moreover, a large portion of tub volume between the buckets is unutilised resulting in a highly inefficient use of the wheelbarrow tub volume.

It would therefore be desirable to provide an alternate or improved wheelbarrow which addresses at least some of the above noted disadvantages.

Before turning to a summary of the invention it is useful to provide an explanation of some of the terms that will be used to define the spatial relationship of various parts thereof. It will be appreciated that a wheelbarrow is generally intended for travel in a single direction which will thus attribute meaning to terms such as the 'front', 'nose' or 'forward' ends of the wheelbarrow. On the basis of this understanding, terms such as 'front', 'rear', 'forward' and 'backward' will be similarly appreciated. Moreover, when a wheelbarrow is operated in a conventional upright orientation, terms such as 'upper' or 'lower' will be generally understood as relative to the ground on which the wheelbarrow is located. This context will also provide reference for terms such as 'upwardly' or 'downwardly', which will be appreciated as referring to a direction that is generally angled away from or toward the ground respectively. Furthermore terms such as 'horizontal' or 'lateral' will be appreciated as denoting an orientation that are parallel to the ground surface on which the wheelbarrow is being operated. Similarly, terms such as 'vertical' or 'upright' will be appreciated as referring to an orientation that is generally perpendicular to the ground surface.

Usage herein of the term "wheelbarrow" is intended to broadly encompass any type of wheelbarrow including, but not limited to, load-carrying carts, trolleys, barrows or wagons both manually operated or powered. It is to be appreciated that this term imposes no particular limitation on the shape or profile of the wheelbarrow receptacle and that a wheelbarrow according to the present invention may or may not include a sloped front wall to facilitate the tipping or pouring of contents from the wheelbarrow tray/receptacle.

SUMMARY OF INVENTION

According to the present invention there is provided, a wheelbarrow including: a receptacle comprising a tub for carrying a load of material; a wheel assembly facilitating movement of the wheelbarrow; a handle for controlling operation of the wheelbarrow; and a plurality of removable compartments located within the receptacle, each for containing a portion of the load of material, the receptacle and each removable compartment being configured to interact with each other so as to, in use, hinder movement of each compartment relative to the receptacle.

A wheelbarrow according to the present invention therefore allows for a load of material to be transported from a filling location to an emptying location in a safer, more robust and more convenient manner than a conventional wheelbarrow or a conventional wheelbarrow haphazardly stacked with cylindrical buckets or other unsecured containers.

In use, the plurality of removable compartments may be filled in situ within the wheelbarrow receptacle or, alternatively, removed from the receptacle and conveniently brought closer to the filling site. In instances where the filling site maybe inaccessible for a wheelbarrow for example, a deep trench, the compartments can be individually carried into the trench and once filled to the desired level, the compartments may be returned to the receptacle ready for transport. Advantageously, the compartments and receptacle are configured to hinder movement of each compartment so as to secure each compartment in a desired position, or a desired range of positions, throughout transport. For this reason, the present invention represents a significant improvement in safety and convenience as compared to existing wheelbarrows and/or wheelbarrow practices. Moreover, the present invention allows obstacles encountered during load transport to be more easily negotiated with the convenient removal of one or more compartments (and a portion of the load contained therein). In this regard, the removal of a compartment advantageously reduces the weight of the wheelbarrow thereby improving manoeuvrability as well as enabling easier and safer lifting of the wheelbarrow, if necessary. In instances where the use of a crude ramp cannot be avoided, the present invention thus enables the traversing of the ramp with a higher degree of safety and convenience. In other instances, the present invention may eliminate the need for traversing a ramp altogether when the emptying location is sufficiently nearby that compartments can be removed and portions of the load carried the remainder of the way to the emptying location.

Furthermore, the removal of compartments at the emptying location allows for material to be conveniently and safely emptied into elevated locations such as skip bins utility vehicle trays or upper scaffolding/multilevel work locations. It will be appreciated that this practice represents a significant improvement in safely and convenience as compared to conventional wheelbarrows which require 'tipping' into the elevated location and thus necessitate the whole material load to be lifted at once in addition to the added weight of the wheelbarrow itself. The present invention is also advantageous when compared to the use of hand-tools to empty the receptacle of a conventional wheelbarrow in that each removable compartment may be removed from the receptacle and inverted over the emptying location to tip the load where desired. If necessary, the compartment may also be tapped to remove residual material contained therein. In this regard, the present invention provides a more efficient mode of emptying a load of material than a shovel, which inevitably results in a residual layer of material remaining in the base of the wheelbarrow. Additionally, the present invention permits convenient and accurate distribution of the wheelbarrow load insofar as a discrete and predetermined volume of the load may be removed from the receptacle and placed at the desired emptying location. The present invention also allows for several discrete portions of the load to be conveniently delivered at a number of different emptying locations. This is to be contrasted with conventional wheelbarrows, in which a less controlled emptying of the load generally requires tipping the entire wheelbarrow contents at once and at a single location.

The present invention also allows a variety of materials to be partitioned from one another in respective compartments. This is particularly advantageous in the field of gardening or landscaping where it may be necessary to carry several varieties of granular, soil or particulate material in a single wheelbarrow. With the provision of discrete compartments, the present invention conveniently may prevent discrete materials from becoming homogenised during transport. Moreover, the configuration of the compartments and receptacle hinder movement of the compartments and thereby may retain the compartments in an upright orientation thus reducing or eliminating the likelihood of spillage and/or undesirable mixing of discrete materials during transport. Moreover, the cleaning of wheelbarrows can be generally inconvenient in that water must be sprayed onto the wheelbarrow receptacle when the wheelbarrow is upended to allow drainage. Advantageously, the compartments of the present invention may prevent the receptacle from becoming dirtied and therefore avoid the need for receptacle cleaning to occur. Instead, the compartments of the present invention may be removed and conveniently cleaned, without the need to upend the wheelbarrow. This is particularly advantageous where it is necessary to clean environmentally hazardous material such as certain unused concrete, chemicals or oils from the wheelbarrow. The compartments of the present invention may be removed to a safe location and cleaned appropriately, without hazardous residuals being washed from the wheelbarrow receptacle onto the ground or into a drain.

The compartments of the present invention may be formed as solid containers suitable for holding liquids or particulate. Alternatively, the compartments may be formed from a mesh or perforated structure suitable for cleaning and clearing wet areas such as flooded homes, ponds and river ways. Mesh-like or perforated compartments may also be used to clean material such as stones or pebbles. The compartments may be formed from a variety of materials include plastics and/or steel.

With the compartments of the present invention being hindered against movement, the present invention also allows control of the mass distribution across the receptacle. This is particularly advantageous in the field of manually operated wheelbarrows which, typically, comprise a tub located between a single load-bearing wheel and a pair of handles. In this regard, it is usually desirable for load to be distributed as close to the wheel as possible in order to maximise the portion of the load being supported by the wheel and thereby reduce the load which must be applied to the handles by the operator. Advantageously, the present invention allows for a load to be deliberately distributed toward the front of the receptacle, in the compartments nearest to the wheel assembly. Moreover, the present invention allows for easier traversing of sloped surfaces, for example lateral movement across a hill, by permitting load to be distributed to a particular side of the receptacle. In this regard, load may be selectively distributed on the uphill side of the wheelbarrow to better distribute the load above the axis of the wheel assembly thereby reducing or eliminating the wheelbarrow's urge to roll or list in the downhill direction. Again, this advantage represents a significant improvement over the practice of carrying unsecured cylindrical buckets of material that are unhindered against movement and otherwise free to roll about or tip over during transport.

As noted above, the present invention may relate to manually operated wheelbarrows discussed in the foregoing as well as powered wheelbarrows that include a motor to drive the wheel assembly thus reducing or eliminating the amount of force required from the operator. Owing to the wide variety of wheelbarrows to which the present invention may apply, it will be appreciated that the components of a wheelbarrow according to the present invention may be similarly various. For example, in some forms of the invention, the wheel assembly may be provided by a single wheel and bearing arrangement while, in other forms, a plurality of wheels may be provided by, for example, a four-wheel, three-wheel or two-wheel arrangement. In another alternative, a wheel assembly according to the present invention may include a tracked wheel assembly, for example a pair of continuous tracks on opposing sides of the wheelbarrow.

In a particular form of the present invention, a frame structure may be provided that connects the handle to the wheel assembly and also supporting the receptacle. In alternative forms, the handle and wheel assembly may be connected directly to the receptacle such that the receptacle body performs the dual function of receptacle and frame. Similarly, a variety of handles may be utilised. In some forms, the handle of the present invention may include a pair of handle members, each extending rearwardly to a free end and a pair of handles being provided at the free ends of the handle members. In other forms, a single C-shaped or U-shaped handle member may be provided on which an operator can place their hands along any portion thereof. In forms of the invention wherein the wheelbarrow is powered, the handle(s) may include toggles, switches or other controls for controlling the operation of a motor.

The receptacle can comprise a tub or tray suitable for carrying a load of material as well as for receiving the plurality of compartments. The tub may be provided in a variety of configurations and may, in some forms, be suitable for retaining liquid or fine particulate. In forms of the invention where the tub is suitable for carrying liquid, the tub may include one or more drainage openings to permit selective drainage of the liquid or particulate by means of a valve or removable plug or closure or the like. It will be appreciated that, when and if desirable, the compartments of the present invention may be each removed and the receptacle of the present invention can be used to directly receive and carry a load of material, in the manner of a conventional wheelbarrow. In contrast to some existing round bucket-carrying devices, the provision of a receptacle which comprises a tub advantageously permits the wheelbarrow of the present invention to serve a dual function as a conventional-type wheelbarrow and also as a compartment-carrying apparatus. The present invention also allows for both functions to be performed simultaneously, for example, a first type of material being carried in the tub and a second type of material to be carried in one or more removable compartments within the tub.

A further advantage of the receptacle being comprised of a tub is evident when transporting low-mass high-volume material for example mulch or leaves. In situations where the wheelbarrow cannot be brought close enough to the filling location the compartments can be filled at the filling location brought to the wheelbarrow and emptied into the receptacle. The wheelbarrow can then be pushed to the emptying location where the full load of low mass high volume material can be easily and quickly tipped from the receptacle. This provides a significant improvement over some existing round bucket carrying devices that do not have a tub/tray for carrying large volumes of material and cannot be quickly emptied via tipping or upending the wheelbarrow. Furthermore, the provision of a receptacle which comprises a tub facilitates interaction between the receptacle and a wide variety of various shapes, volumes and types of compartments (for example toolboxes, buckets, sealed containers, liquid containers, tool trays, sieves, dust pans etc.). These various compartments can also be configured to perform and operate independently of the wheelbarrow receptacle. This provides a significant improvement over some existing round bucket carrying devices that are only configured to carry a plurality of similarly sized round buckets. It will be appreciated that the combination of a tub-type receptacle with the plurality of removable compartments provides a significantly more versatile load-carrying solution as compared to previous tray-only wheelbarrows or previous bucket-carrying carts.

It will be appreciated that the compartment containing the second material is advantageously configured to interact with the tub to hinder its movement thereby reducing the possibility of spillage and undesirable mixing between the first and second materials. In alternative forms of the invention, the receptacle may comprise a mesh structure suitable for carrying medium to large size articles and also for supporting the plurality of compartments contained therein.

A wheelbarrow according to the present invention includes a plurality of removable compartments hindered against movement via the configuration of the receptacle and the associated compartments. In this regard, the present invention includes at least two compartments which interact with the receptacle and are hindered against movement. In certain forms of the invention, the receptacle may include additional compartments, each of which are also hindered against movement by an interaction with the receptacle. In alternative forms, additional compartments may not be hindered against movement. For example, a particular form of the invention may include two 'hindered' compartments configured to interact with the receptacle and two additional 'free' compartments which are located within the receptacle but are otherwise not configured to interact with the receptacle to hinder movement. In this regard, the plurality of compartments hindered against movement will include at least two compartments within the receptacle but not every compartment within the receptacle will necessarily form part of the plurality of 'hindered' compartments.

The plurality of 'hindered' compartments in the receptacle may, in some forms, be secured against lateral movement (i.e. forward, backside and sideways) within the receptacle whilst permitting compartment removal, for example by lifting the compartments out of the receptacle in a generally upward direction. In alternative forms, compartments may be hindered against movement in particular directions within the receptacle whilst permitted to move in alternative directions. In this regard, the 'hindered' compartments of the present invention will generally be restrained in at least one direction of movement but need not necessarily be secured against any and all movement.

The interaction between the receptacle and compartments may be provided in a variety of configurations, all of which falling within the scope of the present invention. In one form of the invention, the plurality of removable compartments may be configured to interact with a receptacle sidewall or receptacle floor. In a particular example, an inner surface of the receptacle sidewall may include a groove for receiving and engaging a corresponding tongue portion on an external surface of a compartment. In another example, the receptacle floor may include a plurality of recesses for seating and engaging with a lower portion of the compartments. In a further example, the floor or sidewall may include a series of projections for engagement within corresponding cavities in a wall of each compartment. In this regard, it will be appreciated that the present invention encompasses any configuration that provides interaction between the compartment and receptacle to hinder movement of the compartments relative to the compartment.

The interaction between the receptacle and the compartments may be provided by the components being complementarily shaped for optimum frictional engagement with the receptacle to hinder the compartments against movement. For example, in a particular form of the invention, the receptacle may include a generally flat floor portion surrounded by a perimeter wall and each of the plurality of compartments may be complementarily shaped for abutment with the floor portion and the perimeter wall to, in use, hinder movement of each compartment relative to the receptacle. Conventional wheelbarrow tubs typically include sloped floors which are not adapted to support or secure a compartment against movement. In most instances, a compartment freely placed within a sloped-floor wheel barrow receptacle will tend to slide downwards along the sloped floor or, where friction between the sloped floor and the base of the compartment is sufficient, may even topple over in the direction of the downward slope. Advantageously, this form of the present invention provides a flat floor portion (i.e. orientated generally horizontally when the wheelbarrow is in a resting position). Moreover, this form of the invention provides that the compartments are complementarily shaped for abutment with the perimeter walls of the receptacle. To this end, the frictional engagement between the compartments with the walls and floor of the receptacle serve to, in use, hinder movement of the compartments. By way of example, the compartments may include a flat-base to permit the compartments to 'stand' upon the flat floor portion of the receptacle. The compartments may also include wall portions shaped parallel to the adjacent perimeter wall so as to facilitate 'nesting' of the compartments within the receptacle, thereby increasing frictional engagement and consequentially hindering the compartments against movement. The provision of compartments which are complementarily shaped therefore facilitates a 'snug' fit within the receptacle that not only reduces the likelihood of movement during use, but also reduces the amount of empty or unutilised receptacle volume outside of the compartments. In an alternative embodiment of the invention to the horizontal/flat floor portion discussed above, the present invention can include receptacle floor, or a portion thereof, which is inclined relative to the horizontal.

In a particularly advantageous form of the invention, the receptacle includes a peripheral rim and each compartment in the plurality of compartments is configured to interact with the receptacle rim. This form of the invention allows for the plurality of compartments to be retained in a position adjacent to the rim and hindered against movement relative thereto. Moreover, selecting the rim as the interaction point between the receptacle and the compartments enables the inner surface of the receptacle to be otherwise formed as a conventional wheelbarrow receptacle. This form of the invention may thus be advantageous over alternatives discussed in the foregoing paragraph which necessitate grooves, recesses or projections on the inner surface of the receptacle. Configurations of the present invention in which the compartments interact with the receptacle rim thus constitute a preferred form of the present invention however, it will be appreciated that the alternative configurations discussed above are nonetheless encompassed by the present invention and may, in particular applications, be suitable or desirable alternatives.

In a particular form of the present invention, each compartment in the plurality of compartments includes a lip for seating on the receptacle rim. In this regard, the receptacle rim and the lip of each compartment may interact so to provide seating engagement with one another to hinder movement of the compartment, relative to the receptacle. The seating engagement may constitute a frictional engagement whereby a compartment is hindered against movement via friction between the receptacle rim and the compartment lip. Said frictional engagement may be provided by a generally linear lip profile which extends horizontally outwards from the periphery of the compartment to overlie or seat upon a portion of the receptacle rim.

In alternative forms, the compartment lip may have a non-horizontal orientation. For example, according to a particular form of the invention, the lip may include a downwardly extending retention portion for retaining the lip in a seated position on the receptacle rim. Advantageously, the retention portion facilitates a more secure interaction between the lip and the rim as compared to linear lips which are configured to interact with the rim via friction only. In some forms, the orientation of the retention portion and the profile of the lip may be configured to complement the profile of the rim so as to mount or nest the lip upon the rim. In these forms, an inside surface of the retention portion may thus abut an outside wall of the receptacle or the rim to hinder the compartment from movement in a direction away from the rim, for example movement toward the centre of the receptacle. In particular forms of the invention, the downwardly extending retention portion may extend substantially vertically downward. In alternative forms, the downward extending retention portion may be angled with respect to vertical so as to extend downwardly but not vertically so.

In a particular form of the invention, the compartment lip may include a flange portion for seating upon an upper surface of the rim and further include the aforementioned retention portion for abutting an outer surface of the receptacle or the rim so as to mount the lip to the rim and thereby hinder the compartment against movement relative thereto. In certain forms, the flange portion of the lip may extend outwardly from the compartment periphery in a horizontal orientation, and the retention portion may extend downwardly from the outer end of the flange portion. In particular forms, the downward extension of the retention portion may be generally vertical, such that the lip profile forms a right-angle. In such a form, the retention portion, the flange portion and a wall of the compartment may collectively form three walls of a channel into which the receptacle rim is inserted during interaction between the compartment lip and the receptacle rim.

The provision of a retention portion as part of the compartment lip will thus advantageously hinder movement of the compartment away from the rim i.e. inwardly toward the centre of the receptacle. In some forms, the frictional engagement between the lip and the rim may also prevent movement of the compartment in a direction along the rim. In other forms, the frictional engagement may be insufficient to do so and may thus permit the compartment to 'slide' along the rim whilst maintaining its seating position on the rim. The exact degree of frictional engagement will be a function of the materials used to manufacture the compartments and the receptacle as well as the amount of material mass contained within the compartment at a given time. However, it is to be appreciated, that even where the interaction between the lip and the rim permits a sliding movement of the lip along the rim, the compartment is nonetheless hindered from movement relative to the rim insofar as the compartment is retained in its position adjacent to the rim by operation of the retaining portion. That is, it will be appreciated that a compartment that is permitted to 'slide' in one direction along the rim is nonetheless hindered from movement in another direction, relative to the rim.

Having generally discussed the interaction between the compartments and the receptacle, the compartments of the present invention may now be discussed in further detail. The types of compartments that may be configured for interaction with the receptacle (in the manner discussed in the foregoing) are of course varied and highly dependent on the particular application for which the wheelbarrow is intended. Advantageously, the present invention allows for a particular wheelbarrow receptacle to be fitted with a variety of compartment configurations to suit a variety of wheelbarrow applications. Moreover, the present invention may be applied to a variety of wheelbarrow receptacles with parameters that are distinctive to a specific application.

In a particular form of the invention, at least one of the compartments is a bucket which includes a base, a peripheral sidewall and a lip extending from the sidewall for seating on the receptacle rim. The bucket lip may be located at or adjacent to the upper or top end or rim of the bucket such that the bucket opening is approximately co-planar with the opening of the wheelbarrow receptacle. In alternative forms of the invention, the bucket lip may extend from the bucket sidewall at a position beneath the bucket rim. By way of example, the bucket lip can be positioned intermediate of the bucket rim and the bucket base. In this form of the invention, when the bucket lip is seated upon the receptacle rim, the bucket rim will be raised above the receptacle rim. In some forms of this embodiment, the base of the bucket may be elevated above the base of the receptacle, providing an additional storage volume beneath the bucket. In alternative forms, the base of the bucket will seat upon the base of the receptacle and the rim of the bucket is raised above the rim of the receptacle.

In a particular form, the bucket lip may comprise four lip segments and, in use, at least two of the lip segments may be seated upon the receptacle rim. The provision of multiple lip segments seated upon multiple rim portions may thus provide a greater hindrance to movement during operation of the wheelbarrow. Depending on the size and placement of a bucket within the receptacle, the number of lip segments seated upon the rim will vary. For example, a bucket located alongside a section of receptacle sidewall may be seated upon the rim via one lip segment only whereas a bucket positioned adjacent to two portions of the rim (for example in a corner of the receptacle) may be seated upon each of the rim portions. It will therefore be appreciated that a single receptacle may include a plurality of buckets, some buckets being seated on the rim via one lip segment only while others are seated upon the rim via two or more lip segments. Accordingly, in a particular form of the invention, at least one bucket is seated on the rim via at least one lip segment and at least one bucket is seated on the rim via at least two lip segments.

In certain forms of the invention, the four bucket lip segments may define a square profile. Alternatively, the four bucket lip segments may define a rectangular profile. A wheelbarrow according to the present invention may therefore be provided with a plurality of removable buckets within the receptacle that are sized and shaped to best utilise the volume of the receptacle. In a particular form of the invention where the receptacle has a generally square shaped rear section, a bucket may be sized so as to extend across the width of the rear section such that three lip segments seat upon three portions of the receptacle rim. In alternative forms of the invention, the lip segments may be non-linear or curvilinear. For example, in a particular form of the invention wherein the receptacle is curved at its corners, the plurality of compartments may be correspondingly curved. In this form of the invention, the lip segments associated with the curved compartments will be similarly curved.

In the foregoing discussion, it is noted that certain configurations of the present invention may allow for compartments to 'slide' along the rim whilst maintaining their seated position thereon. One such example is where a bucket is seated upon the rim via a single lip segment only and where an adjacent empty space is available for the bucket to slide into, for example where an adjacent bucket has been removed. It is also to be appreciated that the foregoing provides a significant improvement over some existing round bucket carrying devices where it is difficult to remove or replace a heavy bucket vertically clear of the carrying devise and across the width of the carry device. Over reaching to remove or replace a heavy bucket can cause serious injury and potential spillage of material. The present invention allows a heavy bucket to slide across the width or length of the receptacle closer to the user before attempting to lift the bucket clear of the receptacle. This allows the user to stay on one side of the receptacle and remove or replace all of the heavy buckets easily and safely. In embodiments of the present invention where the lip segment includes a retention portion, a bucket seated via one lip segment only may be permitted to slide along the rim in a direction parallel with the orientation of the seated lip segment. In contrast, buckets which are seated upon the rim via two or more perpendicular lip segments may be restrained from all sliding movement due to each lip segment hindering the bucket against movement in a direction perpendicular to the orientation of the seated lip segment.

In an alternative form of the invention, the receptacle rim may include a plurality of locating portions for retaining the buckets in a desired position on the rim. The locating portions may comprise locating projections on the rim of the receptacle. This may be provided in instances where a bucket is located on the rim by a single lip segment is would otherwise be free to slide along the rim when the adjacent buckets are removed. For example the rim portion on each side wall of the receptacle rim may include a pair of projections, between which is the rim section onto which the single lip segment is to be seated. Seating the lip segment between the pair of locating projections may therefore prevent or reduce the likelihood of the bucket sliding along the rim when one or more of the adjacent buckets are removed. In some forms of the invention, the locating portions comprise raised portions, protections or 'bumps' on the receptacle rim. Alternatively, the locating portions can comprise recesses in the receptacle rim for receiving a corresponding projection in one or more compartments. In a particular form of the invention, each side edge of the receptacle rim includes a pair of first and second locating portions which comprise raised portions.

Various bucket shapes are conceivable in order to best correspond with the respective receptacle shape and to utilise receptacle volume in the most efficient manner. As noted above, the buckets of the present invention may typically be square or rectangular, or include a combination of square and rectangular buckets, in order to correspond with the typically square or rectangular rear section of a wheelbarrow receptacle. In particular forms of the invention, the whole of the wheelbarrow receptacle may be formed in a rectangular or square profile (when viewed from plan perspective) in which case the whole plurality of buckets may be similarly square or rectangular.

However, in alternative forms of the invention, the front or nose section of the receptacle may be rounded thus forming a receptacle with a square rear portion and an arched front portion. The front portion of the receptacle can, in some embodiments of the invention, also be inclined with respect to the vertical such that the receptacle includes a sidewall portion which is both non-linear and inclined (for example sloped forward). Alternatively, some embodiments of the invention include a receptacle having a non-linear sidewall portion which is generally vertical. Whilst square or rectangular buckets will be appropriate for location within the square rear portion, the present invention may also provide an alternative compartment to occupy the volume of the nose section in the most efficient manner. To this end, in a particular form of the present invention, the receptacle includes a non-linear sidewall portion and at least one of the compartments is a scoop shaped to complement the non-linear sidewall portion to facilitate nesting of the scoop therein. As noted above, the non-linear sidewall portion may be located at the nose of the receptacle. In certain other forms, both the nose and the tail of the receptacle may be formed by non-linear sidewall portions. The provision of a 'scoop' shaped to complement the non-linear portion advantageously provides a compartment capable of occupying the awkwardly shaped receptacle volume within the non-linear sidewall portion and thereby allowing all of the receptacle volume to be utilised.

The scoop can include a lip portion for seating on a portion of the linear or non-linear receptacle sidewall. The scoop lip portion may, in some forms of the invention, be proximate to, or form part of, the scoop rim. Alternatively, the scoop lip may extend from a sidewall of the scoop beneath the scoop rim i.e. intermediate of the rim and the scoop base. In particular forms of the invention, the receptacle may include a non-linear rim portion at an upper end of the non-linear sidewall portion and the scoop may include a non-linear lip portion for seating on the non-linear rim portion. The non-linear lip portion thus enables the scoop to be seated upon the receptacle rim and hindered against movement relative thereto. In certain forms of the invention, the non-linear lip portion of the scoop may include a retention portion that may extend from an upper portion of the scoop, similar to that which is discussed in the foregoing in relation to the various configurations of the bucket lip segments. The scoop may include a rim comprised of the non-linear lip portion and a straight rim portion extending between the opposite ends of the non-linear lip portion. In particular forms of the present invention, the scoop includes a rim having a tapered portion. In particular, the straight rim portion may be provided as the tapered rim portion. Advantageously, when the scoop is removed from the receptacle and placed on its side such that the tapered rim portion abuts the ground, the scoop may also function as a sweeping bin or dust pan whereby the tapered rim portion provides a sharpened or bevelled edge facilitating soils or particulates on the ground to be swept into the scoop. In certain embodiments of the invention having a front section that is inclined with respect to vertical, the complementarily shaped scoop may thus have a generally wedge shaped formation.

In certain forms of the invention, the non-linear sidewall portion and the associated non-linear rim portion may be rounded or curved. Alternatively, in other forms of the invention these non-linear components may comprise a series of linear sub-portions angled with respect to the adjacent sub-portion to collectively define a non-linear structure. In other forms, the non-linear sidewall portion and non-linear rim may include a linear portion as well as at least one rounded portion thereby collectively also providing a non-linear component.

It will be appreciated that the scoop of the present invention is shaped to complement the wheelbarrow receptacle. The above-discussed scoop having a non-linear lip portion is therefore suitable for use with a receptacle having a rounded, arched or otherwise non-linear front section. In an alternative form of the invention, the receptacle includes a linear front wall portion that is inclined with respect to the vertical such that the front region of the receptacle comprises a generally triangular prism. To this end, in a particular form of the present invention, the receptacle includes an inclined linear sidewall portion and at least one of the compartments is a scoop shaped to complement the inclined linear sidewall portion to facilitate nesting of the scoop therein. A scoop for complementing a linear front wall portion may therefore be generally a straight-walled shaped as a triangular prism. The straight-walled scoop may include a linear lip portion for seating on the linear front wall portion of the receptacle. As noted above, the inclined linear sidewall portion may be located at the nose of the receptacle. In certain other forms, both the nose and the tail of the receptacle may be formed by inclined linear sidewall portions. The provision of a 'scoop' shaped to complement the inclined linear sidewall portion advantageously provides a compartment capable of occupying the awkwardly shaped receptacle volume within the inclined linear sidewall portion and thereby allowing all of the receptacle volume to be utilised.

A particular embodiment of the invention includes a plurality of compartments shaped to nest within or abut an inclined sidewall of the wheelbarrow receptacle. In a particular example, the receptacle includes an inclined front sidewall and a pair of compartments sized and shaped to occupy the volume defined within the receptacle by the inclined front wall. The present invention can include a plurality of scoops which collectively occupy the volume within the receptacle defined by the linear or non-linear inclined receptacle sidewall portion.

With reference to the above discussion of the buckets and scoops provided by aspects of the present invention, it will thus be appreciated that the present invention provides a significant improvement in receptacle volume utilisation as compared to the prior art practice of haphazardly carrying standard-size cylindrical buckets within conventional wheelbarrows. Moreover, unlike conventional buckets, the bucket and scoop of the present invention may be configured to seat upon the rim of the wheelbarrow receptacle therefore reducing the possibility of becoming upended during use.

The number and type of compartments in the plurality of compartments provided with the present invention will depend on the parameters of the particular wheelbarrow receptacle. As noted above, a rectangular or square shaped receptacle need not be provided with a scoop because the receptacle volume may be wholly occupied/utilised using only square or rectangular shaped buckets. Alternatively, in instances where the receptacle includes a sloped nose portion, a specifically shaped scoop may be included to occupy this space whilst at least one bucket can be provided to occupy the square shaped tail section of the receptacle. As such, in a particular form of the invention, a wheelbarrow according to the present invention may include at least one bucket and at least one scoop. In a particular form, the present invention may include at least one scoop and at least two buckets. Another specific form of the invention may include at least one scoop and at least four buckets. A further form may include a number of buckets and a pair of scoops located at either end of the receptacle. Of course, it will be appreciated that the present invention encompasses a variety of additional and alternative compartment configurations with the most desirable configuration being dependent on the intended application of the wheelbarrow.

A particularly advantageous form of the present invention includes four 20 litre buckets and one 20 litre scoop so as to limit the amount of weight in each compartment. Moreover, this compartment configuration advantageously addresses occupational health and safety requirements in certain jurisdictions where manual handling limits of 15-20 kg apply. In this regard, the present invention effectively divides the total load into smaller portions for convenient and safe transport. The present invention thus allows for the total wheelbarrow weight to be reduced in order to increase manoeuvrability and facilitate movement to an elevated location. Moreover, individual compartments may be lifted, for example onto a scaffold, into a trench or over a garden retaining wall where a whole wheelbarrow would otherwise be unable to go. The present invention may also have particular application in the fruit and vegetable industry where the discrete compartments may be used to sort and separate fruits or vegetables of various qualities as they are picked. In some forms of the invention, a series of volume indicators or markings may be provided on the inside and/or outside of the compartments in order to aid accurate measuring and mixing of the materials contained therein. In a particular form, the non-linear rim portion of the receptacle and/or the non-linear lip portion of the scoop may include a pouring recess to aid in the pouring of viscous or liquid materials such as concrete or liquid fertiliser.

Some forms of the present invention may include a sufficient number of compartments such that, when all compartments are located within the receptacle, the receptacle opening is wholly obscured or occupied by compartments. Therefore in some forms of the invention, the receptacle includes an opening for receiving the plurality of compartments and the plurality of compartments are sized to occupy the total area of the opening. This provides a significant improvement over some existing round bucket carrying devices where material can fall between the round buckets creating a build-up of material on the ground that can become a tripping hazard and a doubled handling of the material. Similarly, in particular embodiments, the plurality of compartments may be sized to substantially occupy the total volume of the receptacle. In alternative embodiments, the receptacle volume or the area of the receptacle opening may be only partially occupied with compartments such that a portion of the receptacle is left available for material to be carried within the receptacle, outside of the compartments. This provides a significant improvement over some existing round bucket carrying devices where the receptacle and the compartment can perform a dual function of a conventional-type wheelbarrow and also a compartment-carrying apparatus. The upper periphery of the compartments of the invention may be sized and shaped so as to abut one or more adjacent compartments. This arrangement reduces the amount of load material that is accidently spilt between adjacent buckets which may otherwise build up in the base of the receptacle and could undesirably affect the placement of the compartments therein. This form of the invention therefore provides a significant improvement over haphazardly carrying cylindrical buckets within a wheelbarrow which cannot be arranged to occupy the total area or volume of the wheelbarrow and are not retained upright during transportation.

Each of the compartments in the plurality of compartments may include a handle to facilitate removal of the compartment from the receptacle. In some forms, the handle may be pivotally mounted on the respective compartment to allow the handle to be moved between an operating position and a folded position. In addition to facilitating removal of the compartment from the receptacle, the handle allows for convenient transport when compartments must be carried between the receptacle and a desired emptying or filling location. In particular forms of the invention, the handles are arranged inboard of the compartment periphery so as not to interfere or abut adjacent compartments within the receptacle. As noted above, it is generally advantageous for compartments to be arranged in a tight configuration so as to reduce the area therebetween and thus reduce the likelihood of compartment material being accidently split between adjacent compartments during the filling process. To this end, the provision of the handles inboard of the compartment periphery facilitates said tight configuration.

In a particular form of the invention, the receptacle has a base which includes a shoulder defining an upper and a lower base portion wherein at least one compartment is located above the lower base portion and a wall of the compartment abuts the shoulder so as to, in use, hinder movement of the compartment relative to the receptacle. Compartments located within the receptacle above the lower and the upper base portions may be sized accordingly so as to complement the varying receptacle volumes above the respective base portions. For example, compartments intended for location above the lower base portion may be generally taller than compartments intended for location above the upper base portion. In particular forms, the shoulder may be located rearwardly of the lower base portion and the compartment located above the lower base portion is hindered against rearward movement.

As foreshadowed above, a wheelbarrow according to an embodiment of the present invention may be configured for manual operation. Alternatively, the present invention may equally apply to a motorised or powered wheelbarrow. In either instance, the present invention is advantageous in that it allows for portions of the wheelbarrow load to be discretely loaded, transported and emptied whilst allowing for compartments to be located within the receptacle in such a way that movement is hindered during use.

A wheelbarrow according to the present invention may also include a variety of additional features to assist an operator in everyday use. For example, a plurality of cleats may be provided to facilitate connection to a lifting device. In this regard, the plurality of cleats provides a convenient connection point for a crane in instances where, for example, it is necessary to lift a loaded wheelbarrow to an elevated location using a crane. The present invention may also include at least one support element for receiving and supporting a hand-tool during operation of the wheelbarrow. In some forms, the present invention may include a pair of said support elements which are formed by hook elements located on an outer side of the receptacle. In this way, a hand tool such as a shovel or rake may be conveniently carried whilst the operator's hands are allowed to remain on the wheelbarrow handles. The hook elements may be configured so as to extend from a wheelbarrow frame below the receptacle and may, in some forms, be coated by a rubberised material to increase friction and thus support a hand-tool more securely during transport. The hook elements may also include holes therein for receiving a strap to securely tie down hand-tools or tether the wheelbarrow to a vehicle for safe transport. To this end, the provision of support elements and, in particular, hook elements to carry long-handled tools represents a significant advantage over the traditional practice of carrying tools within the wheelbarrow receptacle where the handles can undesirably protrude toward the operators face or eye level. It will be appreciated that the support elements or hook elements may be provided on a wheelbarrow according to the present invention or, alternatively, may represent a separate invention in any subsequent patent applications claiming priority hereto.

In some forms of the invention at least one of the plurality of compartments may include a removable lid. Advantageously, a wheelbarrow according to the present invention may therefore be used to transport hazardous waste or material in which spillage is highly undesirable.

In a particular form of the invention, one of the compartments comprises a toolbox compartment for receiving and storing hand tools. The toolbox compartment may include a hinged lid and/or a handle. Advantageously, the provision of a toolbox compartment enables users to ferry tools to and from a work site within the wheelbarrow. The toolbox compartment is hindered against movement relative to the receptacle and therefore provides a secure location in which tools can be transported and stored.

The present invention may include a securing arrangement to secure the compartment against upward movement, relative to the receptacle. A variety of alternative arrangements are envisioned for selectively securing the compartments against upward movement relative to the rim. In some forms of the invention, the receptacle can include a hinged clip system for clipping the compartments to the receptacle. Alternatively, or in addition to this arrangement, the compartments can include a flexible lip segment configured for snap fit engagement with the receptacle to securing the compartments in a desired position and retain the compartments against unintentional upward movement during use.

In a particular form of the invention, at least one of the compartments is a liquid container. For example, the liquid container may be an enclosed vessel having a sealed opening for receiving and emptying the liquid contents. The liquid container may be hindered against movement in the same manner as the buckets or scoop discussed in the foregoing. For example via frictional engagement with the floor and walls of the receptacle. Alternatively, the liquid container may include a lip for engagement with the rim of the receptacle. In a particular embodiment of the invention, the scoop defines a liquid-storing compartment.

The present invention may also include provision for a ramp to be fitted to a portion of the wheelbarrow, for example the upper edges of the compartments. This may, for example, facilitate the transport of an empty wheelbarrow up stairs instead of being lifted. In this regard, a loaded wheelbarrow may be transported to the base of the stairs, each of the compartments respectively removed and carried up the stairs, the ramp is then used to transport the wheelbarrow up the stairs, the loaded compartments are returned to the receptacle and the ramp subsequently fitted to the wheelbarrow again. In particular forms, the compartments may be formed with a ramp-receiving recess or channel on their underside such that compartments may be inverted and placed on the ground with the ramp seated within the ramp-receiving recess to form a temporary work bench or seat. In some forms, a ramp strap may also be provided to secure the ramp to the wheelbarrow, for example where the wheelbarrow is to be bound to a vehicle for transportation. The ramp attachment can be configured to interact with the plurality of compartments and/or the receptacle to retain the ramp attachment in position during movement of the wheelbarrow.

BRIEF DESCRIPTION OF DRAWINGS

The present invention will now be described with reference to the figures of the accompanying drawings, which illustrate particular preferred embodiments of the present invention, wherein:

FIG. 11 is a side sectional view of the receptacle illustrated in FIGS. 1 and 2.

FIG. 12 is a rear sectional view of the receptacle illustrated in FIGS. 1 and 2.

FIG. 13 is a magnified view of a portion of FIG. 12, illustrating a sectional view of the bucket lip and receptacle rim configuration.

DETAILED DESCRIPTION

Figure 1:
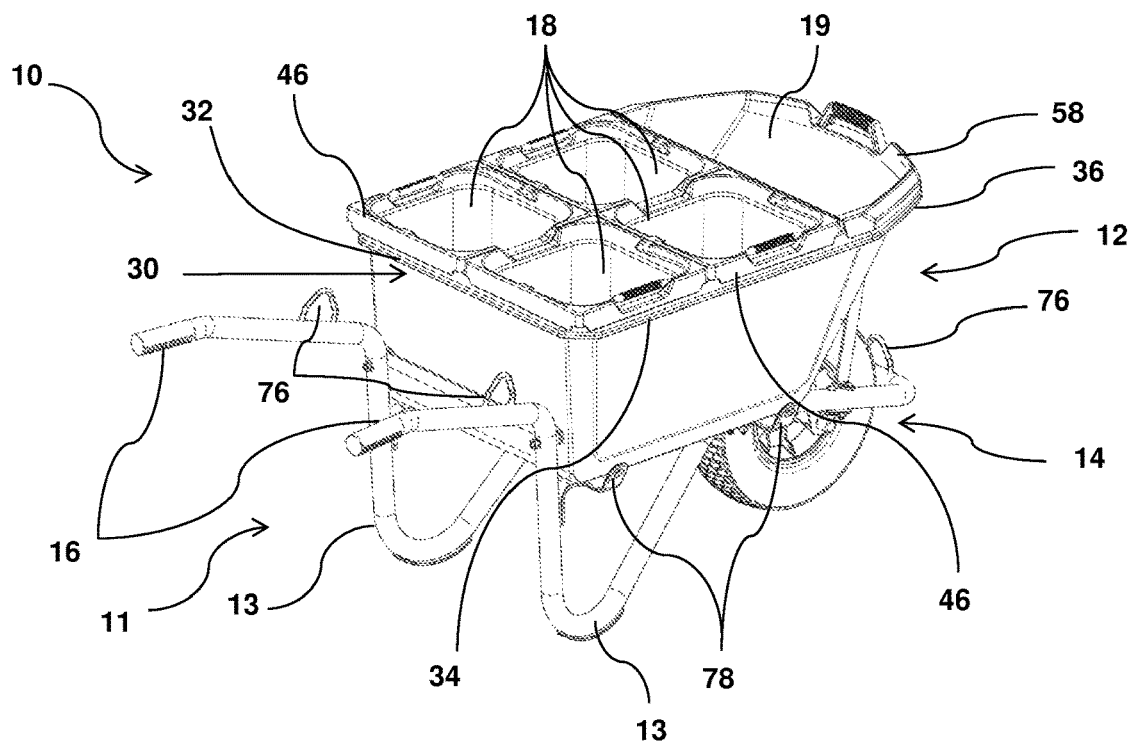
FIG. 1 is a perspective view of a wheelbarrow according to a first embodiment of the present invention.
Figure 2:
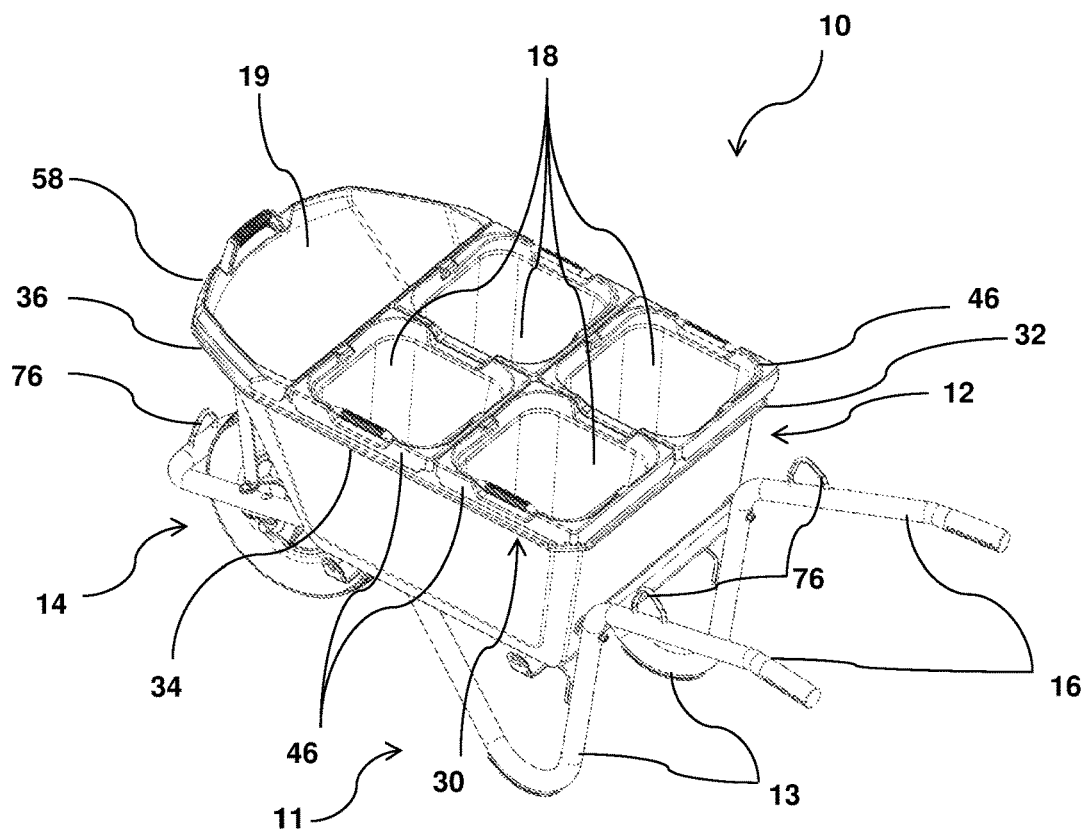
FIG. 2 is a perspective and more elevated view of the embodiment illustrated in FIG. 1.
Figure 3:
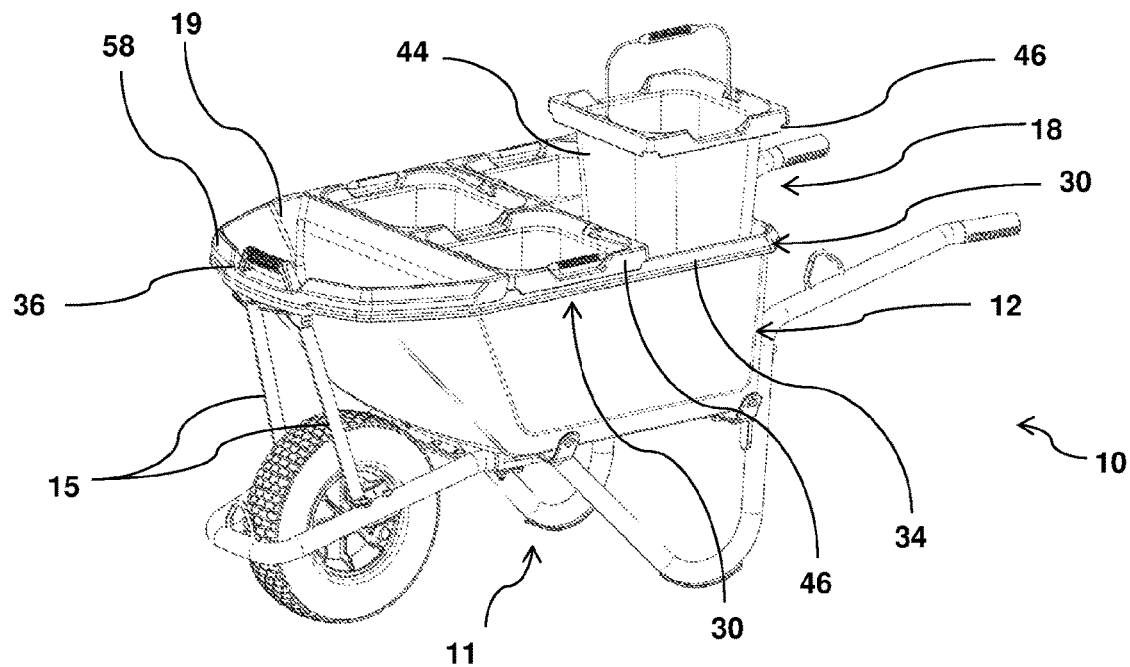
FIG. 3 is a perspective view of the wheelbarrow illustrated in FIGS. 1 and 2, with one of the buckets partially removed.

FIGS. 1 and 2 illustrate two alternative perspectives of a wheelbarrow 10 including a receptacle comprising a tub 12, a wheel assembly 14, a pair of handles 16 and five removable compartments comprising four buckets 18 and one scoop 19 that are located within the tub 12. The buckets 18 and the scoop 19 are each nested within tub 12 and proximate to one another such that the upper periphery of each compartment 18, 19 abuts that of at least one adjacent compartment 18, 19. Each compartment 18, 19 has an internal volume of approximately 20 L and, as discussed in the foregoing, the plurality of compartments 18, 19 thus facilitates a load to be split into smaller, easily-handled portions as well as allowing materials to be sorted and separated according to their variety. Wheelbarrow 10 also includes a frame 11 which supports tub 12 and provides a mounting point for the wheel assembly 14 and the handles 16. Frame 11 includes a pair of legs 13 extending downwardly from the rear of the tub 12. As best illustrated in FIG. 3, wheelbarrow 10 also includes a pair of struts 15 extending between the frame 11 and the nose of the tub 12.

Before turning to a discussion of the interaction between the compartments 18, 19 and the tub 12, the features of tub 12 will be briefly discussed with reference to FIG. 6 which illustrates wheelbarrow 10 with compartments 18, 19 removed from tub 12. As discussed in the foregoing, it will be generally appreciated that wheelbarrow 10 is generally intended for travel in one direction, that being with the wheel assembly 14 at the forward end and with the user operating the handles 16 at the rear end. In this context, the terms 'side', 'front' and 'rear' in the following description will be generally understood.

Figure 6:
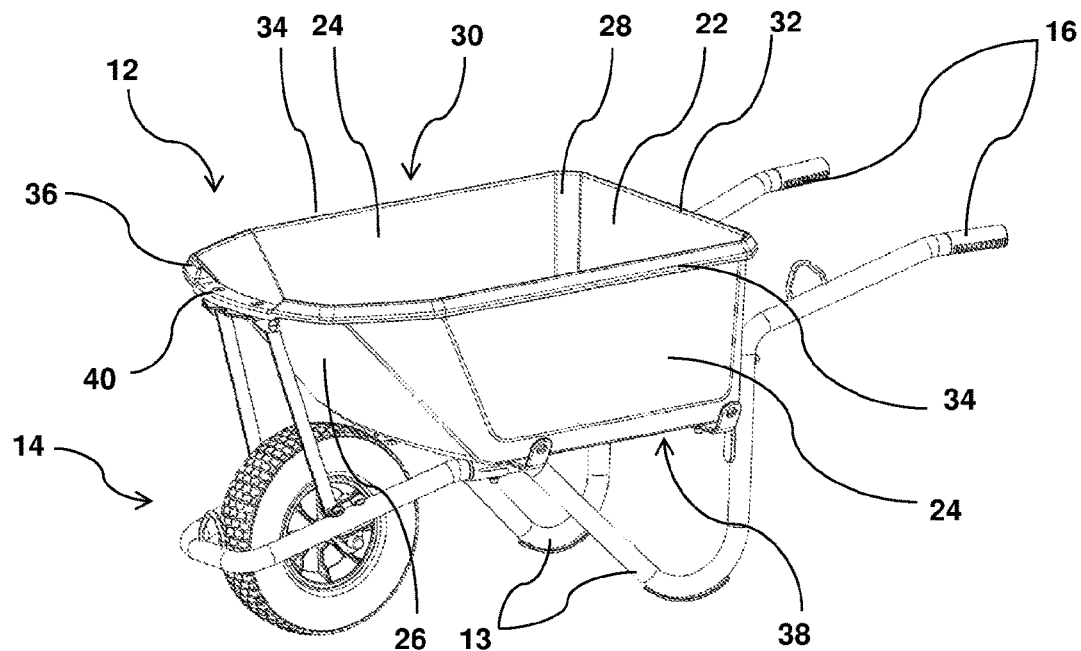
FIG. 6 is a perspective view of the wheelbarrow in the foregoing figures with all compartments removed.

As illustrated in FIG. 6, tub 12 includes a perimeter tub sidewall which, when notionally divided into portions, includes a rear wall 22, a pair of opposing side walls 24 and a non-linear front wall 26. A corner wall 28 is located at either end of the rear wall 22 where the ends of the rear wall 22 meet each of the respective side walls 24. Tub 12 also includes a rim 30 extending around the upper edge of the perimeter tub sidewall and may also be notionally divided into portions corresponding to the above-described sidewall portions. In this regard, tub rim 30 includes a rear rim portion 32 at an upper edge of rear wall 22, a pair of opposing side rim portions 34 at the upper edges of side walls 24 and a rounded front rim portion 36 at the upper edge of non-linear front wall 26.

Figure 14:
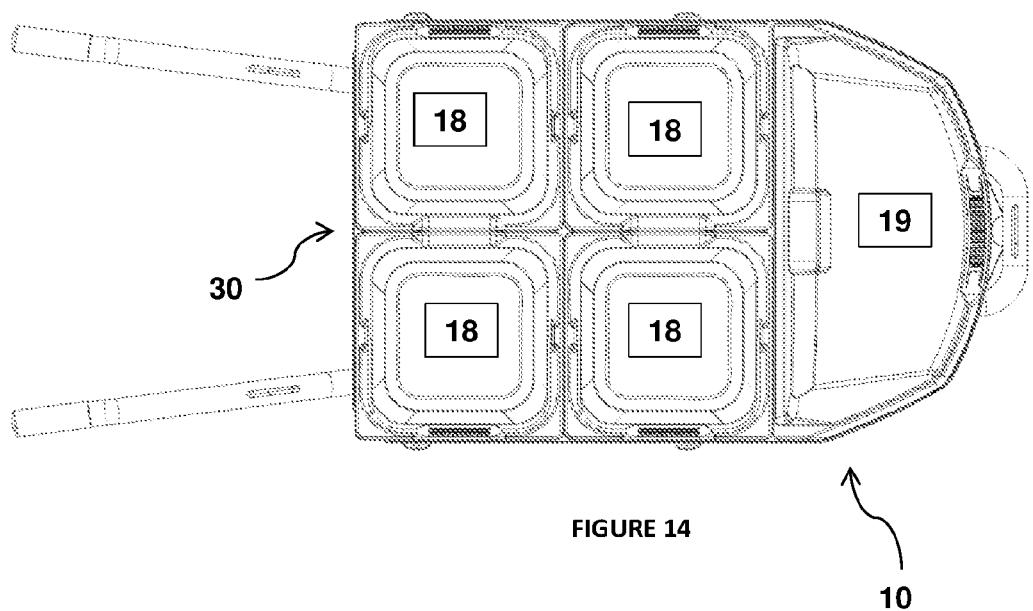
FIG. 14 is a plan perspective of the wheelbarrow according to the first embodiment of the present invention.

Still referring to FIG. 6, rear wall 22 and side walls 24 comprise generally planar wall structures, each extending, in an upright orientation, between the tub floor 38 and their respective rim portions 32, 34. The respective rear and side rim portions 32, 34 are thus similarly linear and together form a generally three-sided square profile which extends from each end of the non-linear front rim portion 36. As best illustrated in FIG. 14, when viewed from a plan perspective, the front end of tub rim 30 is thus generally arch shaped with the rear end of tub rim 30 being generally square shaped.

With brief reference to FIGS. 11 and 12, and as noted above, the rear wall 22 and side walls 24 are orientated in a generally upright or near-vertical orientation. In contrast, the front wall 26 is inclined with respect to vertical and, in the particular cross-section illustrated in FIG. 11, extends from the tub floor 38 at approximately 45°. In this regard, when materials a re loaded into tub 12 directly (i.e. not contained within the compartments 18, 19) the arched shape of front wall 26 thus facilitates fluid, particulate or viscous materials to be poured from the tub 12 at the arch apex where a tub spout 40 is located (best illustrated in FIG. 6). By way of example, a volume of water may be carried in tub 12 and, at the emptying location, an operator may raise handles 16 such that wheelbarrow 10 is tilted forward and the water may be poured as desired, via the tub spout 40.

Figure 7:
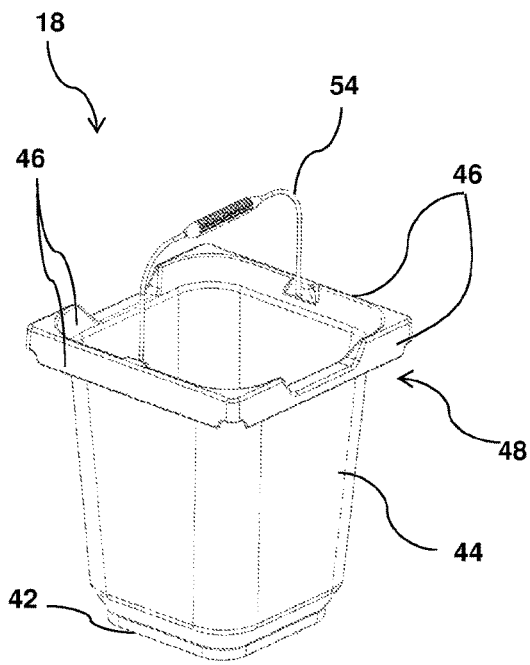
FIG. 7 is a perspective view of a bucket according to the present invention.
Figure 8:
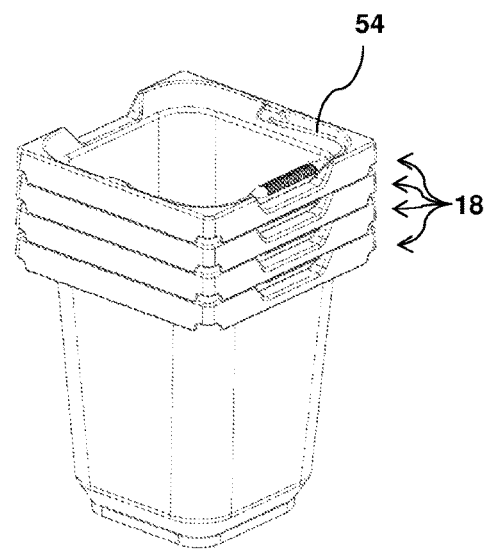
FIG. 8 is a perspective view of a plurality of the buckets illustrated in FIG. 7 in a stacked configuration.

Having outlined the features of tub 12, the features of compartments 18, 19 will now be described in further detail. With reference to FIG. 7, bucket 18 includes a bucket base 42, a bucket sidewall 44 and two pairs of opposing bucket lip segments 46 extending from an upper portion 48 of the bucket sidewall 44. In the illustrated embodiment, each of the bucket lip segments 46 are of equal length such that the four bucket lip segments 46 therefore define a square upper bucket periphery. Turning briefly to FIG. 13, each bucket lip segment 46 includes a tapered rim 47, a flange portion 50 and a downwardly extending retention portion 52. As shown in FIG. 11, tapered rim 47 is tapered inwardly toward bucket base 42. As illustrated in FIG. 12, the bucket sidewall 44 is slightly tapered toward the bucket base 42 and thus, as illustrated in FIG. 8, facilitates the uniformly shaped buckets 18 to be received within one another for the purpose of stacking buckets 18 when they are empty, for example, during transport. FIG. 7 illustrates that, bucket 18 also includes a bucket handle 54 pivotally mounted to the inside of the upper portion 48 of the bucket sidewall 44 to facilitate the bucket 18 being manually placed within, or removed from, tub 12.

Figure 9:
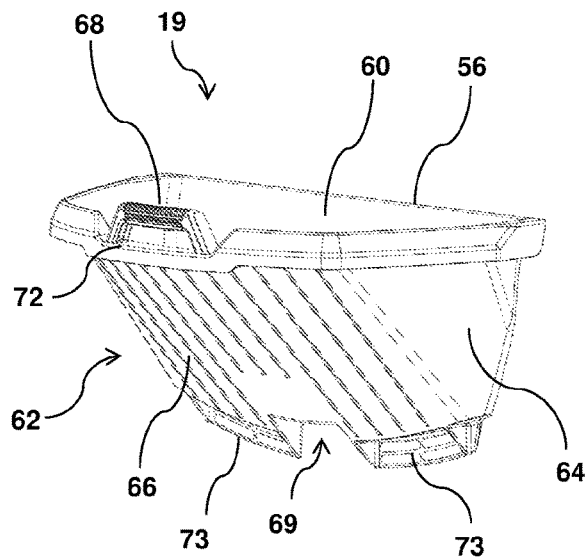
FIGS. 9 and 10 are views of the scoop from a front and a rear perspective respectively.
Figure 10:
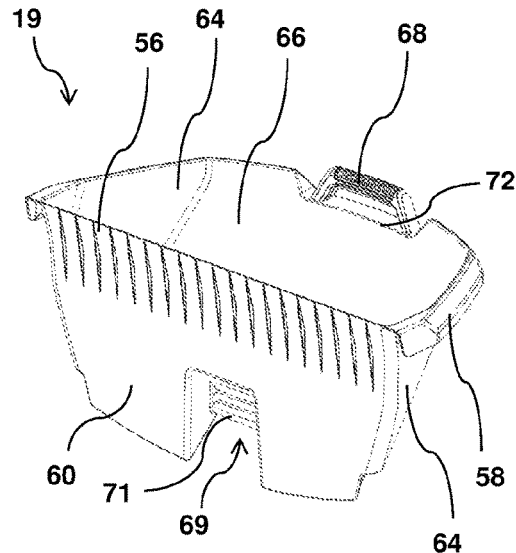

Referring now to scoop 19 and to FIGS. 9 and 10, the walls of scoop 19 include a linear wall portion 60 extending between the ends of an arched wall portion 62. As will be discussed in further detail below, the shape of the arched wall portion may be dependent upon the shape of the tub front wall 26. In the illustrated embodiment, the arched wall portion 62 comprises a pair of rounded corner portions 64 located on either side of an inclined wall portion 66. The inclined wall portion 66 is generally planar and is inclined with respect to the vertical in a similar manner to the tub front wall 26. In this regard, the arched wall portion 62 is comprised of a planar or linear component (inclined wall portion 66) and a pair of non-linear components (rounded corner portions 64). In alternative forms of the invention, the arched wall portion may instead be provided by a single rounded portion or by a series of consecutive linear portions angled with respect to each other so as to collective create an arched or a non-linear wall component.

Still referring to FIGS. 9 and 10, it will be appreciated that the linear wall portion 60 and the arched wall portion 62 occurs on three sides of the linear wall portion 60. Namely, the two the opposite side edges of linear wall portion 60 meet each of the rounded corner portions 64 and the bottom edge of linear wall portion 60 meets the lower edge of inclined wall portion 66. In this manner, the scoop 19 is generally formed with a wedge structure with the 'pointed edge' of the wedge being formed at the convergence point of the linear wall portion 60 and the inclined wall portion 66.

At the upper edges of the arched wall portion 62 and the linear wall portion 60 there is provided an arched scoop lip 58 and a linear rim portion 56 respectively. In this regard, at the upper periphery of scoop 19, the linear rim portion 56 extends between the ends of the scoop lip 58. As best illustrated in FIG. 11, the scoop lip 58 is comprised of a downwardly extending scoop retention portion 70, the operation of which will be discussed in further detail below. A scoop handle 68 is provided at the apex of the arch of the scoop lip 58 for facilitating manual handling of the scoop 19. At the base of scoop 19 the linear wall portion 60 and the inclined wall portion 66 are recessed to define a grab handle 69 which, either alone or in conjunction with handle 68, facilitates the lifting or carrying of the scoop 19. As illustrated in FIG. 10, grab handle 69 includes a textured grip portion 71 for improving manual grip during use of the grab handle 69. The scoop handle 68 extends from and overarches a scoop spout 72 which facilitates the pouring of liquid, viscous or particulate material from the scoop 19. Alternatively, liquid viscous or particular material contained within the scoop may be poured by gripping the scoop handle 68 and grab handle 69 and by pouring the material over the linear rim portion 56. In instances where greater accuracy is required, scoop 19 may be tilted to one side and the contents poured from the corner of scoop 19, where one of the corner portions 64 meets the linear wall portion 60.

Figure 5:
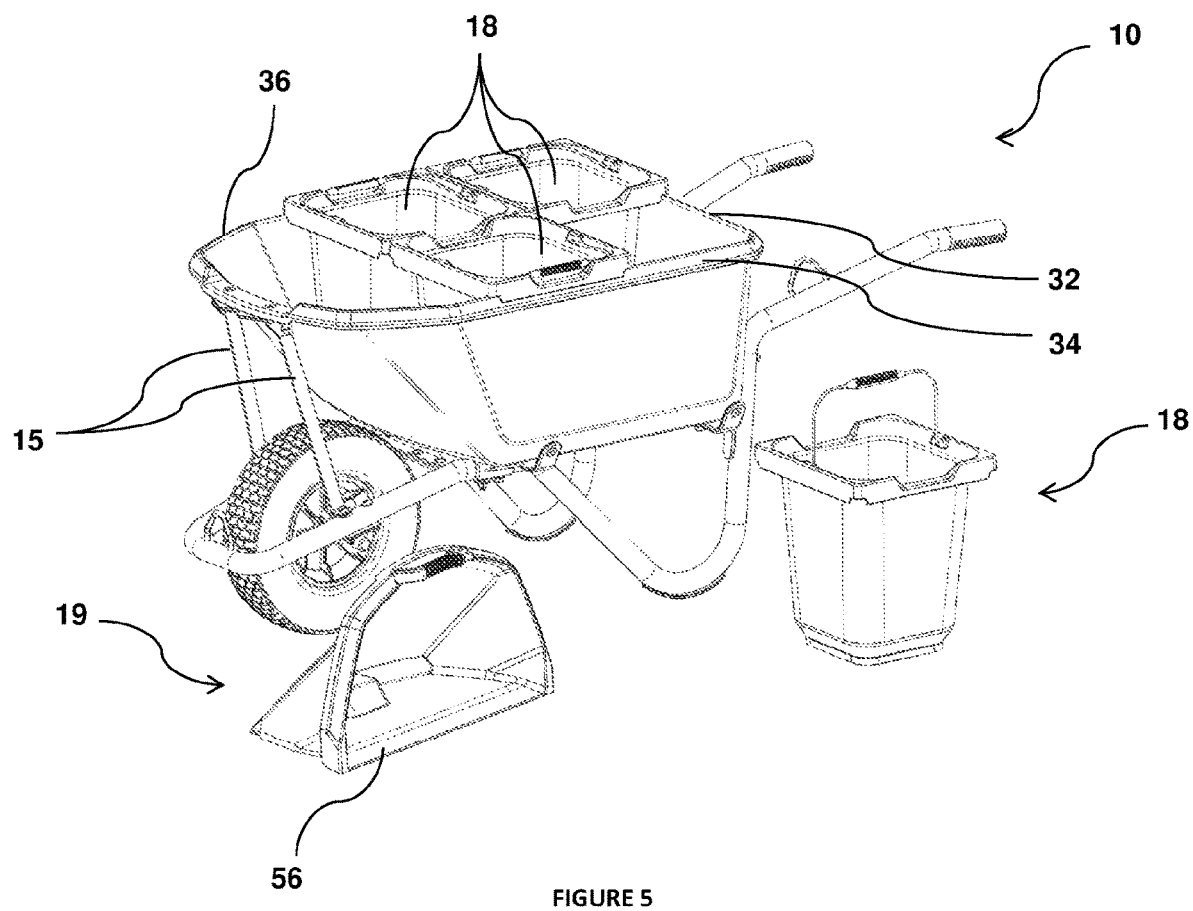
FIG. 5 is a perspective view of the wheelbarrow illustrated in FIG. 4 with the scoop completely removed and placed on the ground in a dust-pan configuration.

As best illustrated in FIGS. 5 and 11, the linear rim portion 56 is bevelled so as to provide a sweeping edge to facilitate use of the scoop 19 as a dust or sweeping pan. By way of example, (and as shown in FIG. 5) when the scoop 19 is placed on the ground with the linear rim portion 56 lying upon the surface to be swept, debris or dust can be conveniently swept from the ground over the sweeping edge and into the cavity within the scoop 19. As illustrated in FIG. 9 on either side of the grab handle 69 is a foot portion 73. Advantageously, when scoop 19 is used in the dust or sweeping pan configuration illustrated in FIG. 5, the pair of foot portions 73 provide surfaces on which a user may place their foot to hold the scoop 19 in place during use. The pair of foot portions 73 each include a textured surface to improve grip with a user's foot, boot or shoe.

Having described the features of tub 12 and also the features of compartments 18, 19 the interaction between these various components may now be discussed in further detail.

Figure 4:
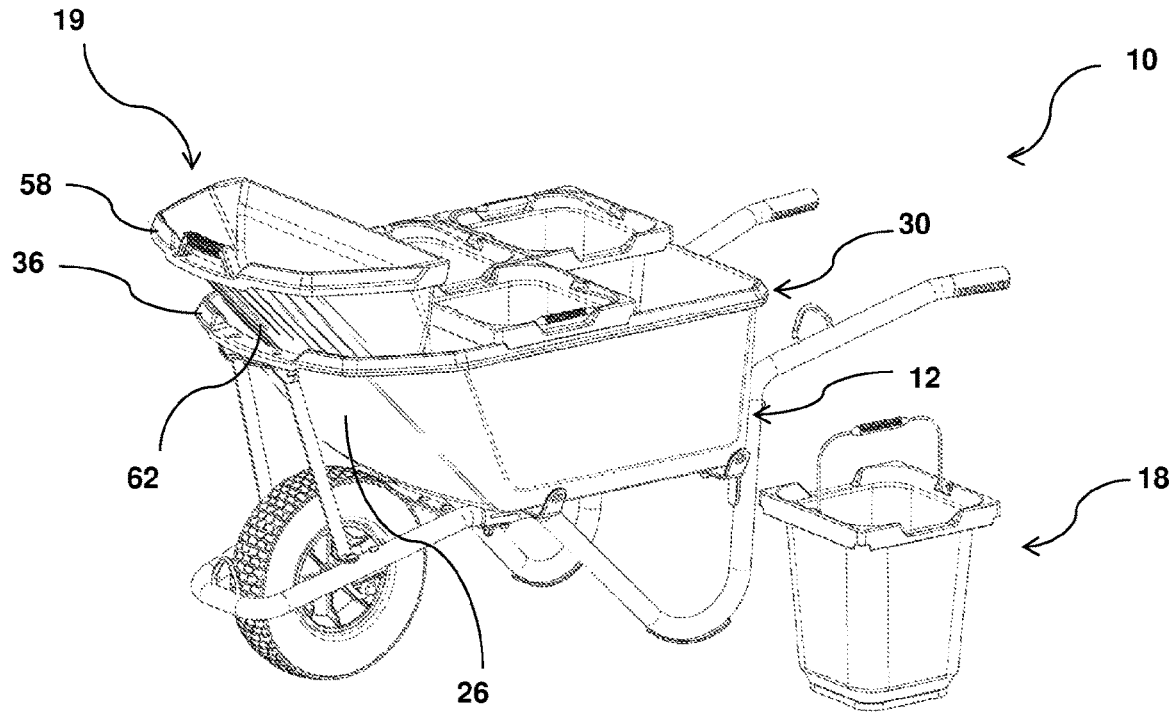
FIG. 4 is a perspective view of the wheelbarrow illustrated in FIG. 3 with the scoop partially removed and the bucket completely removed.

FIGS. 3 and 4 illustrate an embodiment of the invention whereby the compartments 18, 19 and the tub 12 are configured to interact with each other so as to hinder movement of each compartment relative to the tub. In particular, the bucket lip segments 46 of buckets 18 and the scoop lip 58 of scoop 19 are configured to seat upon the tub rim 30 and to thereby restrict or limit the movement of the compartments 18, 19 relative to the tub 12.

As best illustrated in FIG. 1 or 2, each of the buckets 18 at the rear of the tub 12 is configured to seat upon both the rear rim portion 32 and one of the side rim portions 34. In this regard, the buckets 18 at the rear of the tub 12 are seated on the tub rim 30 via two lip segments 46. In contrast, the pair of buckets 18 adjacent to the scoop 19 are each seated only on the side rim portions 34. Therefore, these buckets 18 are seated on tub rim 30 via one bucket lip segment 46 only. As best illustrated in FIG. 3, the scoop 19 interacts with the tub rim 30 via the seating of the scoop lip 58 on the arched front rim portion 36.

The seating of compartments 18, 19 on the tub rim 30 will now be further described with reference to the cross-sectional perspectives provided in FIGS. 11-13. FIG. 11 illustrates a side sectional perspective of the tub 12 and illustrates the scoop lip 58 seated upon the front rim portion 36. In particular, the downwardly extending scoop retention portion 70 is illustrated overlying the front rim portion 36 and thus hindering movement of the scoop 19 relative to the tub rim 30. In this position, the inclined wall portion 66 abuts the non-linear tub front wall 26 such that scoop 19 is nested within the cavity defined by the front wall 26. As shown in FIG. 4, it will be appreciated that the arched wall portion 62 of scoop 19 is shaped to complement the non-linear front wall 26 of tub 12. In this regard, the scoop of the present invention may be formed in a variety of shapes so as to correspond or complement with a particular wheelbarrow tub and to nest within the cavity defined by a non-linear tub wall.

Referring again to FIG. 11, a bucket 18 is illustrated adjacent to scoop 19 such that one of the lip segments 46 of the bucket 18 almost abuts the linear rim portion 56 of scoop 19. Compartments 18, 19 are sized with tolerances to allow some spacing between adjacent compartments however it will be appreciated that, in use, movement or minor flexing of the compartments 18, 19 may result in abutment of adjacent compartments. By way of example, FIG. 11 illustrates an abutment of lip segments 46 on the two adjacent buckets 18 located behind the scoop 19.

FIG. 12 illustrates a rear cross-section of tub 12 with a pair of adjacent buckets 18 each seated upon a side rim portion 34, each via a bucket lip segment 46. A magnified perspective of said seating is provided in FIG. 13 which illustrates flange portion 50 overlying side rim portion 34. The downwardly extending retention portion 52 extends from the flange portion 50 and abuts an outer side of the rim 30 so as to retain the bucket 18 in its seated position on rim 30. As illustrated in FIG. 13, side rim portion 34 and indeed all of rim 30 is generally tapered towards its upper portion so as to facilitate location of the compartment lip thereon. As discussed above, where a bucket 18 is seated on rim 30 via a single lip segment 46 (for example, the pair of buckets 18 adjacent to scoop 19) then the buckets 18 may be permitted to slide along the rim 30 toward the front or rear of tub 12. This may occur, for example where the rear buckets 18 have been removed such that the central buckets 18 are adjacent to an empty space into which they may be free to slide during use. Similarly, buckets 18 which have slid backwards towards the rear of the tub may be free to slide forward, returning to their original position. However, even with scoop 19 removed, centre buckets 18 will generally not be permitted to slide forward into the tub volume defined by the non-linear wall portion 26 as they are obstructed by the constricting non-linear wall portion 26 and the constricting front rim portion 36 and tub floor 38. In typical use, the removal of rear buckets 18 will generally not result in backward movement of centre buckets 18 on account of a tub 12 being generally tilted forward. However, in instances where wheelbarrow 10 is being pushed uphill, this forward tilt may be relatively counteracted by the slope of the hill such that backward movement of centre buckets 18 is permitted. In instances where rearward movement of the centre buckets 18 is undesirable, for example, maintaining a load distribution as close to the nose of the tub 12 as possible, the pair of rear buckets 18 may be inserted to prevent rearward movement of the centre buckets 18.

Notwithstanding rearward movement of the centre buckets 18 being permitted in instances where the rear buckets 18 are removed, it will be appreciated that centre buckets 18 which are permitted to slide along the rim 30 are nonetheless retained in a seated position on with rim 30 and are hindered against movement away therefrom, toward the centre of tub 12. In other words, in the instance that buckets 18 are permitted to slide, they are nonetheless hindered from movement in at least one direction. In this regard, and as noted above, the term 'hinder' will be appreciated as hindering lateral movement in at least one direction, but not necessary all directions. As noted above, the buckets 18 are seated upon the rim 30 via two lip segments 46 to both the rear rim portion 32 and a side rim portion 34 and will therefore be hindered against movement in all lateral directions, including when the adjacent buckets 18 are removed.

As illustrated in FIGS. 11 and 12, the bucket bases 42 may, in some embodiments, be configured to make contact or stand upon tub floor 38. In alternative embodiments (not illustrated) bucket bases 38 can be spaced apart from tub floor 42 such that the mass of the buckets and their contents are wholly supported by the interaction between the bucket lip and the tub rim. In these embodiments, the tub may therefore include an additional storage volume beneath the bucket bases 38 which may be used to carry material in addition to the material carried within the compartments.

As shown in FIGS. 1 and 2, the frame 11 includes three cleats comprised of lifting loops 76 to facilitate connection to a lifting device such as a crane. On either side of frame 11 there is also provided a pair of support elements comprised by side hooks 78 for carrying hand-tool during operation of wheelbarrow 10.

In an example application of the present invention wheelbarrow 10, a user may first fill compartments 18, 19 using a shovel or other hand tool. When an obstacle is present between the filling and emptying locations, for example traversing uneven terrain or a negotiating a ramp, the user may selectively remove one or more of compartments 18, 19 and manually carry them over the extent of the obstacle using the compartment handles 54, 68. In this regard, the 20 L volume of the compartments 18, 19 limits the maximum weight of each compartment 18, 19 to between 15-20 kg and, thus, within Australian Occupational Health and Safety requirements. Once the weight of the wheelbarrow 10 has been reduced as desired, the user may traverse the uneven terrain or the ramp with the lightened wheelbarrow 10 in a safer and more efficient manner. Once the obstacle has been traversed, the compartments 18, 19 that have been removed from the tub 12 may be reinserted and the wheelbarrow 10 can be transported to the final emptying location.

In another example application of the present invention, the weight distribution of wheelbarrow 10 can be managed by locating the bulk of the load mass toward the front of the tub 12 where the maximum load can be transported through the wheel assembly 14. This is to be contrasted with conventional wheelbarrows in which, for example, 20 Litres of liquid or particulate will spread out evenly across the length of the tub 12. Advantageously, the same 20 Litre load may be contained solely within the scoop 19 at the front of the tub 12 thus reducing the amount of effort required of the operator to transport the load. In instances where the wheelbarrow load consists of larger articles which may not fit within compartments 18, 19 the centre buckets 18 and may be removed and the rear buckets 18 placed on their side within the tub 12 to maintain the load in a generally forward region of tub 12.

As noted in the foregoing, when traversing across a sloped surface, wheelbarrow 10 allows load to be selectively distributed on the uphill side of the wheelbarrow to better distribute the load above the axis of the wheel assembly thereby reducing or eliminating the wheelbarrow's urge to roll or list in the downhill direction. By way of example, load may be distributed only in two buckets 18 which are engaged with the side rim portion 34 on the uphill or upward side of the hill or slope.

In alternative forms of the present invention, the tub may be formed in a different shape to the tub illustrated by tub 12. For example, alternative wheelbarrow tubs may be provided without an arched or rounded nose portion. A scoop compartment shaped to complement this alternative tub may thus be formed as a triangular prism. A tub according to the present invention may also include a vertical front wall as distinct from the sloping front wall in tub 12.

In other alternative forms, a pair of buckets 18 may be replaced with a single, rectangular bucket. In the context of wheelbarrow 10, said rectangular bucket may be located behind the scoop 19 thereby seating on both side rim portions 34. Alternatively, said rectangular bucket may be located at the rear of tub 12 so as to seat on both side rim portions 34 and the whole of the rear rim portion 32.

It will therefore be appreciated that a wide variety of differing compartment configurations is envisioned within the scope of the present invention. The above-discussed configuration having four buckets 18 and one scoop 19 is shown in plan perspective in FIG. 14. However a variety of alternative compartment or tub configurations are illustrated in FIGS. 15 to 19, which will now be discussed in further detail.

Figure 15:
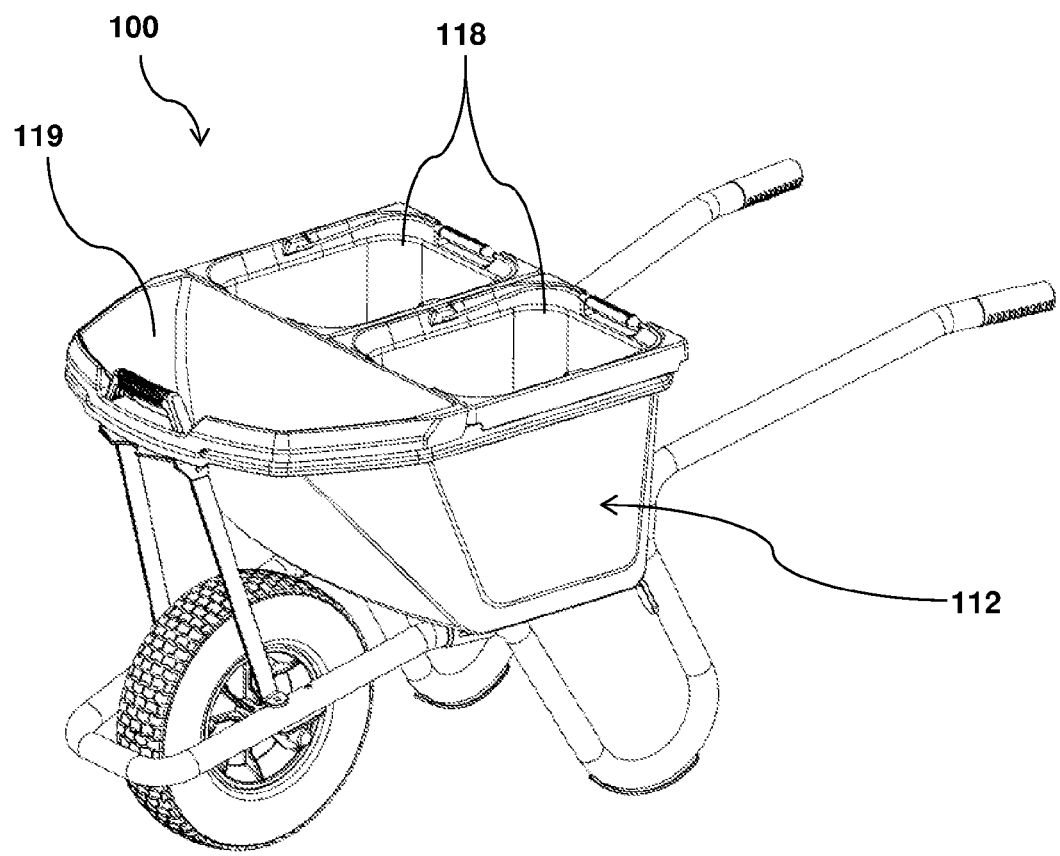
FIG. 15 is a perspective view of a wheelbarrow according to a second embodiment of the present invention.

FIG. 15 illustrates a wheelbarrow 100 according to a second embodiment of the present invention having a shortened 3-compartment 90 litre tub 112 as compared to the 5-compartment 140 litre tub 12 in the first embodiment and as discussed and illustrated in the foregoing. In particular tub 112 includes a pair of 25 litre buckets 118 and a 20 litre scoop 119. The rims of buckets 118 are slightly elongated so as to provide a rectangular profile and therefore comprise the additional 5 litres of additional volume as compared to the 20 litre buckets 18 of the first embodiment. Wheelbarrow 100 is particularly envisioned for domestic applications where a more compact wheelbarrow may be desirable.

Figure 16:
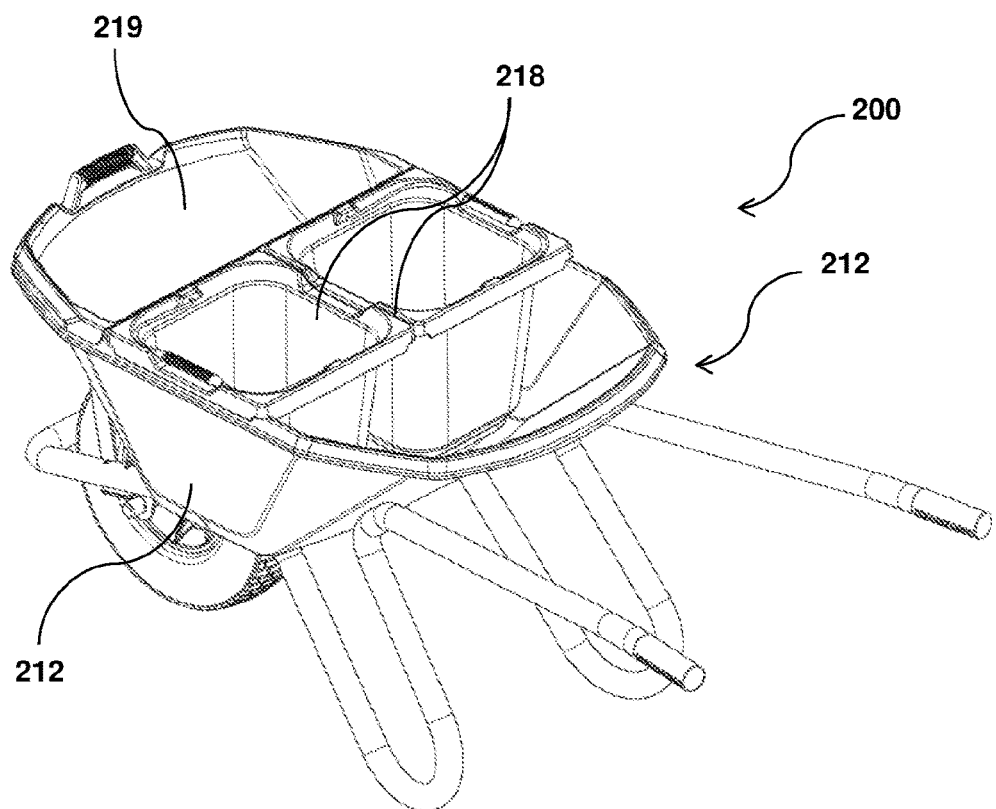
FIG. 16 is a perspective view of a wheelbarrow according to a third embodiment of the present invention

FIG. 16 illustrates a wheelbarrow 200 according to a third embodiment of the present invention having an oval-shaped 80 litre tub 212 and a 3-compartment configuration consisting of a pair of 15 litre buckets 218 and a single 15 litre scoop 219. Tub 212 has a lower profile or shallower configuration and may therefore be particularly suited to use with a domestic concrete mixer which are often located close to the ground. The rear of tub 212 is left unoccupied by a compartment so as to allow, for example, gloves, spades or other items to be carried in front of the operator. In alternative forms, wheelbarrow 200 may be fitted with a pair of scoops 219 at either end of the tub 212.

Figure 17:
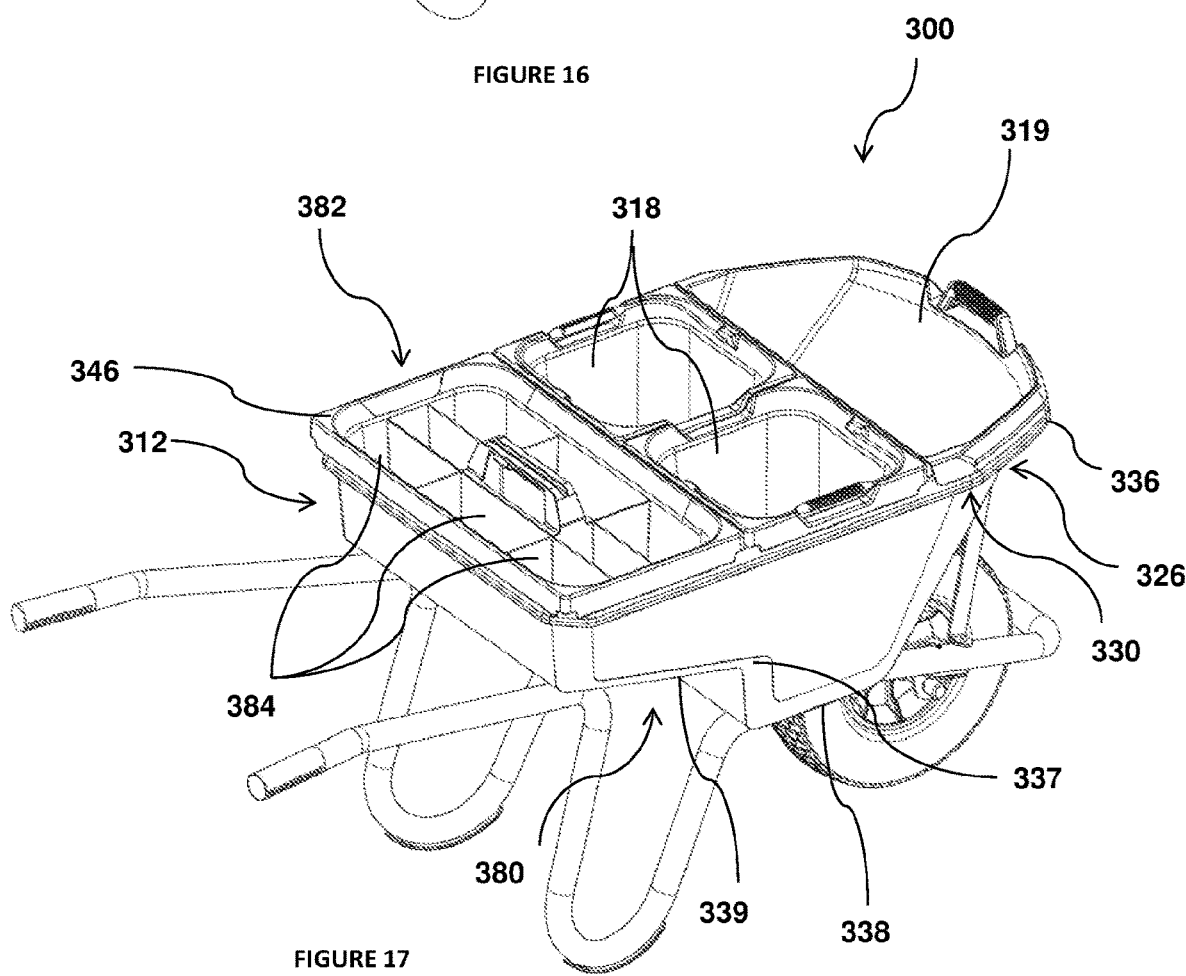
FIG. 17 is a perspective view of a wheelbarrow according to a fourth embodiment of the present invention

FIG. 17 illustrates a wheelbarrow 300 according to a fourth embodiment of the present invention including a 110 litre tub 312 similar in profile to tub 12 of the first embodiment but for a cut-out 380 in the lower rear section such that the rear portion of the tub 312 is shallower than the front portion. Cut-out 380 therefore defines a corresponding shoulder 337 on the base of tub 312. In this regard, the base of tub 312 includes a lower base portion 338 and an upper base portion 339 with the base portions 338, 339 being separated by shoulder 337. Similar to the foregoing embodiments, wheelbarrow 300 includes a pair of 20 litre buckets 318 and a 20 litre scoop 319. However, unlike the foregoing, wheelbarrow 300 further includes a partitioned compartment 382 having a number of discrete sub-compartments 384 for sorting or organising a number of small articles for example screws, nails, washers, drill bits or other building materials. Similar to buckets 318, partitioned compartment 382 includes four lip segments 346 however partitioned compartment 382 is seated upon the rim 330 of tub 312 via three lip segments 346. Partitioned compartment 382 is located above the upper base portion 339 and is therefore shallower than buckets 318 which are located above the lower base portion 338. However, it is to be appreciated that partitioned compartment 382 could, nonetheless, be replaced with a single appropriately sized rectangular bucket or a pair of appropriately sized square buckets. For example, partitioned compartment 382 could be replaced with pair of square 10 litre buckets (not shown).

With reference to the various examples above, it will be appreciated that the volume of the buckets can generally range between 10 Litres to 45 Litres. However it will be appreciated that various other bucket sizes outside of this range are envisioned and would be suitable for use with the present invention.

It will also be appreciated that when partitioned compartment 382 is removed from tub 312, buckets 318 will nonetheless be retained in position and not permitted to slide backwards by virtue of the cut-out 380. Advantageously, when partitioned compartment 382 is removed from tub 312, buckets 318 are hindered from rearward movement by virtue of their abutment against shoulder 337. Even with scoop 319 removed, buckets 318 will be hindered against forward movement as they are obstructed by the non-linear wall portion 326 and by the constricting front rim portion 336 and tub floor 38.

Figure 18:
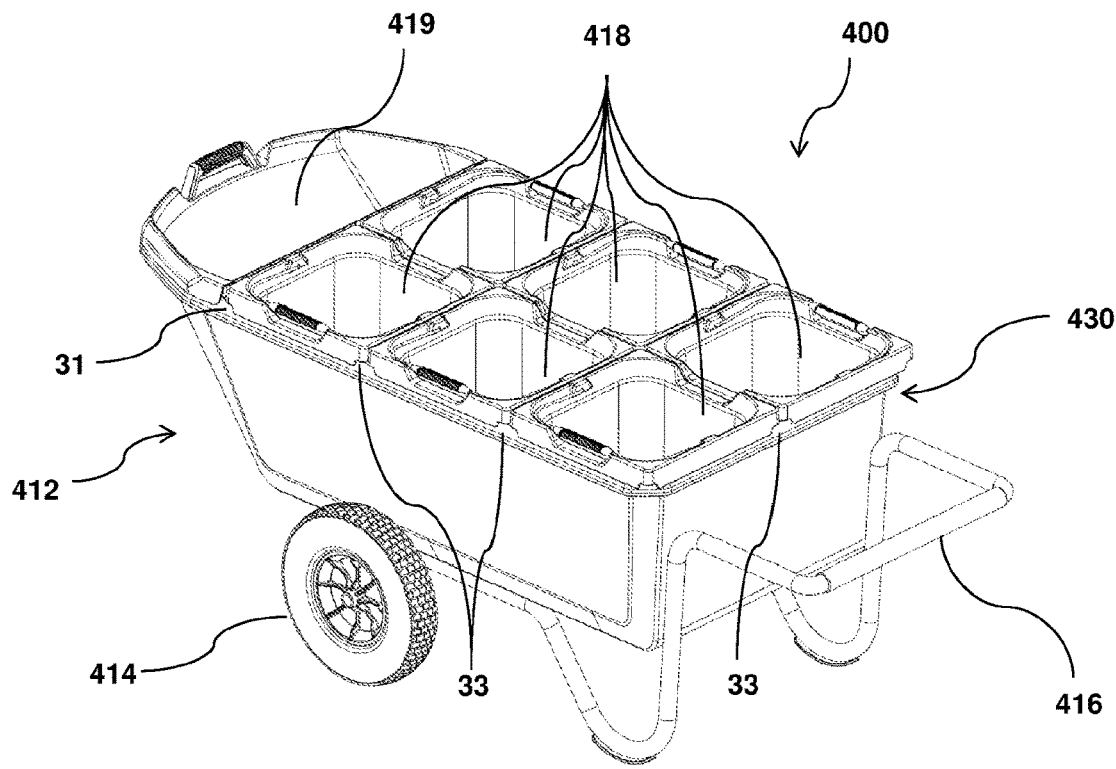
FIG. 18 is a perspective view of a wheelbarrow according to a fifth embodiment of the present invention

FIG. 18 illustrates a wheelbarrow 400 according to a fifth embodiment of the present invention having a 7-bucket extended tub 412. Seated upon the rim 430 of tub 412 are six buckets 418 and one scoop 419. At the rear of wheelbarrow 400 is a one-piece handle 416. As compared to the foregoing embodiments, wheelbarrow 400 includes additional buckets therefore allowing for a larger amount of material to be transported. Wheelbarrow 400 includes a wheel assembly comprising a pair of wheels 414 located on opposite sides of the tub 412.

Figure 19:
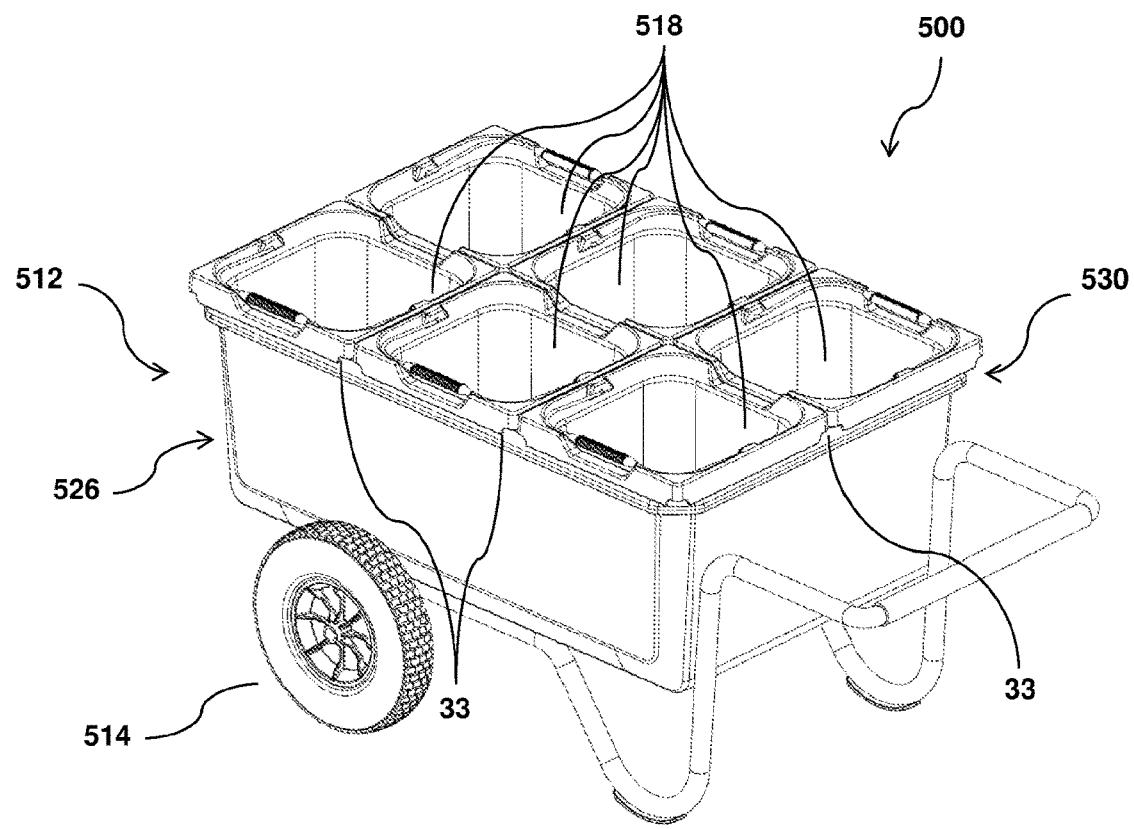
FIG. 19 is a perspective view of a wheelbarrow according to a sixth embodiment of the present invention

FIG. 19 illustrates a wheelbarrow 500 according to a sixth embodiment of the present invention. As distinct from the foregoing embodiments and illustrations, the tub 512 of wheelbarrow 500 includes a linear front wall 526 such that the profile and the rim 530 of wheelbarrow 500 are generally rectangular. As such, wheelbarrow 500 does not include a scoop compartment. Instead, wheelbarrow 500 includes six buckets 518. Wheelbarrow 500 is envisioned, in particular, for sorting applications such as fruit or vegetable picking where the tub 512 will seldom be used to carry materials directly and therefore a spout-shaped front wall is generally not necessary. Instead, wheelbarrow 500 includes six buckets 518 for carrying/sorting a variety of materials. Wheelbarrow 500 includes a wheel assembly comprising a pair of wheels 514 located on opposite sides of the tub 512.

It will be appreciated that, in contrast to the wheelbarrows illustrated in the foregoing Figures, wheelbarrow 500 includes a generally vertical or square front-wall and as distinct from the angled or sloping front wall of the previously illustrated embodiments. In this regard, it will be appreciated that wheelbarrow 500 is not configured for the 'tipping' of contents as wheelbarrows 10, 100, 200, 300, 400 are configured to do. As noted above, usage herein of the term 'wheelbarrow' is not intended to impose any limitation on the shape or structure of the wheelbarrow tub and it will be appreciated that a wheelbarrow may, inter alia, include any load-carrying device having a tub, wheel assembly and handles.

Figure 20:
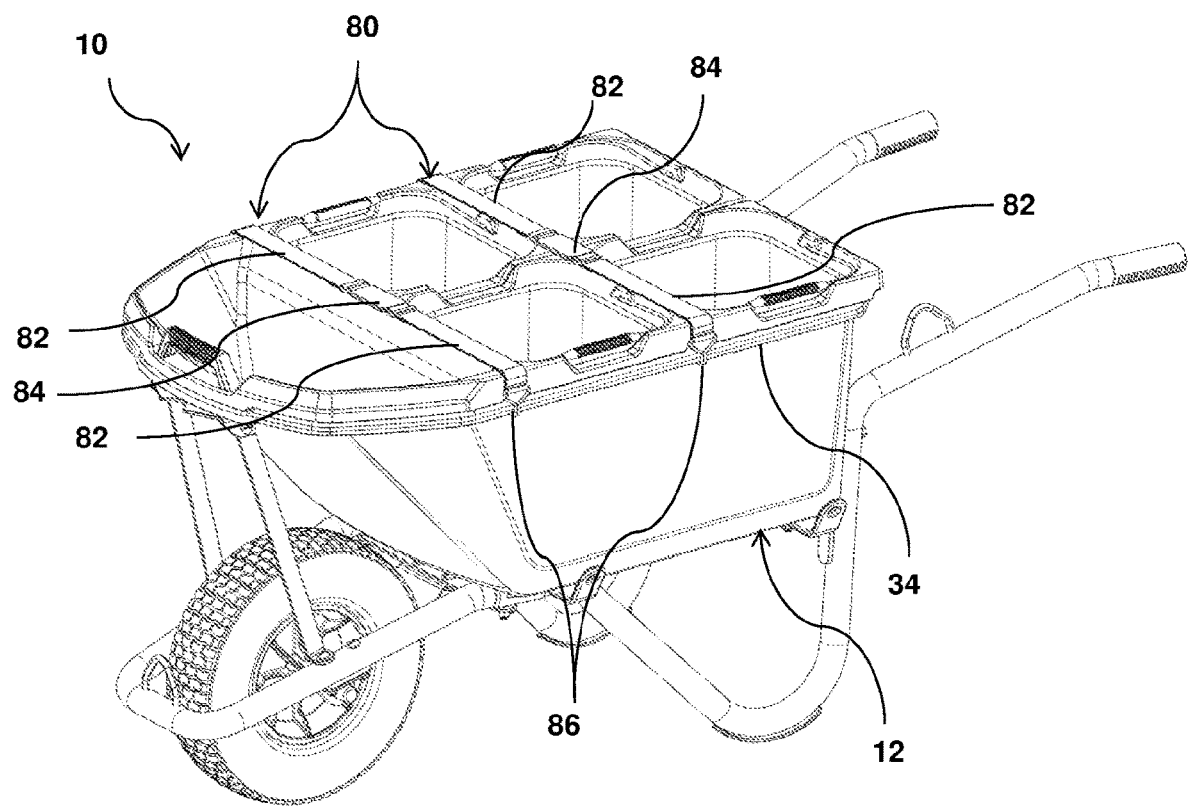
FIG. 20 is a perspective view of the first embodiment wheelbarrow illustrated in FIG. 1 with an added strapping system.

FIG. 20 illustrates wheelbarrow 10 in accordance with the above-discussed first embodiment of the present invention further including a pair of straps 80 fastened across the upper surface of the wheelbarrow 10. Each strap 80 includes a pair of outer sections 82 connected by an elastic inner section 84. Outer sections 82 may be formed from canvas or nylon whereas elastic inner section 84 may be formed from a rubberized material to permit stretching and facilitate connection of the straps 80 to the wheelbarrow 10. Straps 80 connect to the wheelbarrow 10 via hooks 86 attached to the underside of side rim portions 34. Hooks 86 may be formed from plastic or metal. Advantageously, straps 80 may be used to retain the compartments in place when storing the wheelbarrow 10 in a vertical orientation for example leaning again a wall or when tied to the back or side of a vehicle. The straps may also be used to secure the compartments down when moving a load that is low in mass for example garden mulch and traversing over very rough ground. In these circumstances, it is possible that the compartments may jump or move around within the tub 12 and, therefore, straps 80 may also provide a convenient solution whereby the compartments are firmly secured in place. In an alternative form of the invention, straps may be configured to be extendable and may attach to the front and rear portions of the wheelbarrow 10 so as to extend longitudinally across the upper surface of the wheelbarrow 10.

Figure 21:
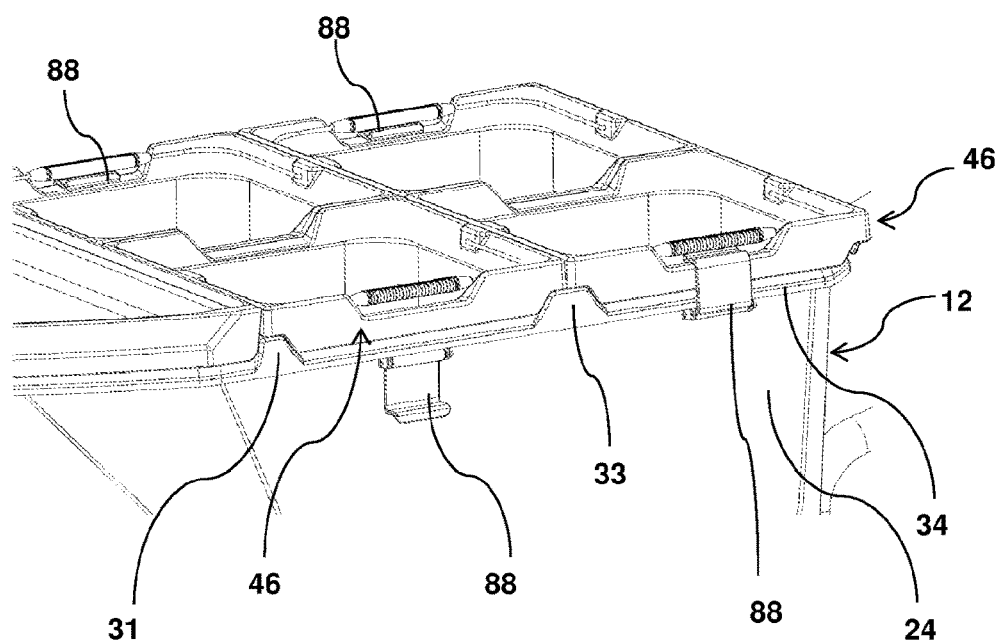
FIG. 21 is a perspective view of a wheelbarrow according to the present invention with an added hinged clip system.
Figure 22:
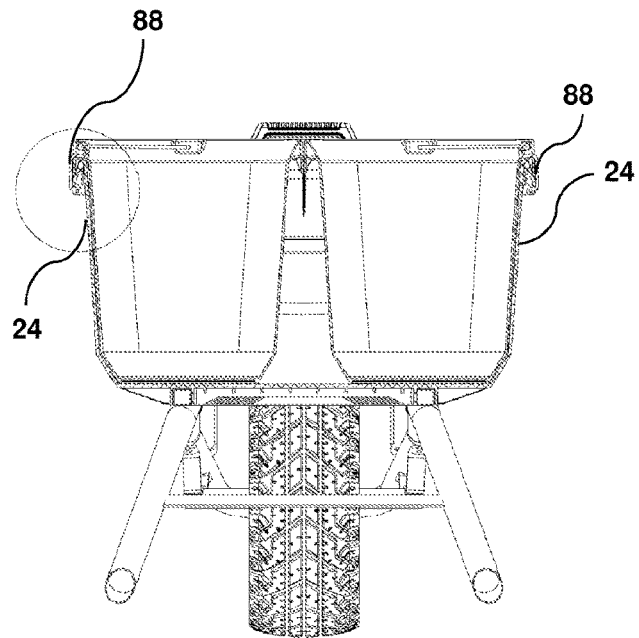
FIG. 22 is a cross section of the wheelbarrow illustrated in FIG. 21.
Figure 23:
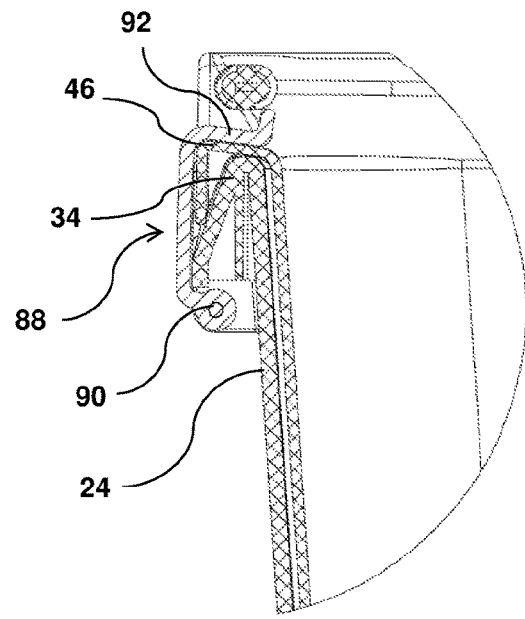
FIG. 23 is an enlarged view of the clip cross section illustrated in FIG. 22.

The present invention may include a securing arrangement to secure the compartment against upward movement, relative to the receptacle. A variety of alternative arrangements are envisioned for selectively securing the compartments against upward movement relative to the rim. FIG. 21 illustrates a hinged snap-clip system wherein tub 12 is provided with hinged clips 88 configured to snap fit bucket lip segments 46 in position relative to tub side rim 34. As best illustrated in FIGS. 22 and 23, clips 88 are hingedly mounted via hinge 90 to the upper edge of tub side walls 24, beneath side rim 34. Clips 88 include a latching portion 92 for engaging with an upper surface of bucket lip segment 46. Clips 88 are formed from a resiliently flexible material such as plastic permitting latching portion 88 to snap-fit with lip segment 46. As illustrated in FIG. 21, two clips 88 are provided on the side walls 24 of tub 30. However, in alternative embodiments clips may also be provided on the tub rear wall.

Figure 24:
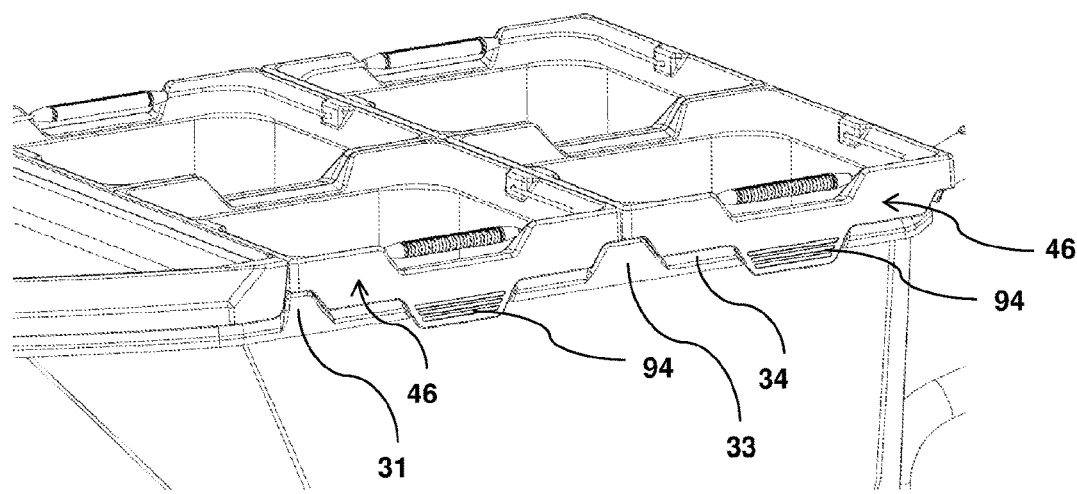
FIG. 24 is a perspective view of a wheelbarrow according to the present invention with an added bucket snap-clip arrangement.
Figure 25:
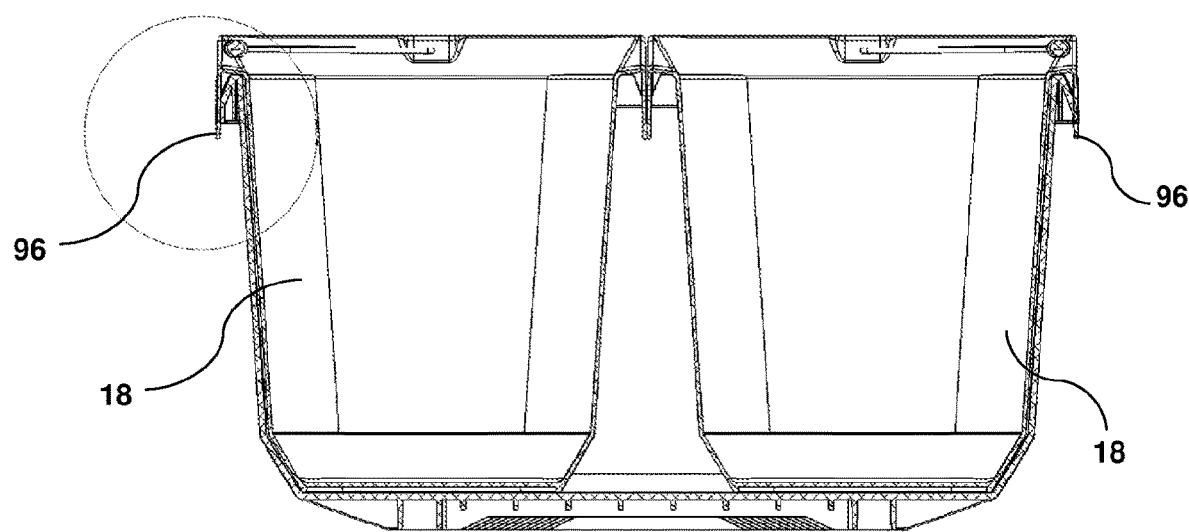
FIG. 25 is a cross sectional view of the snap-clip arrangement illustrated in FIG. 24.
Figure 26:
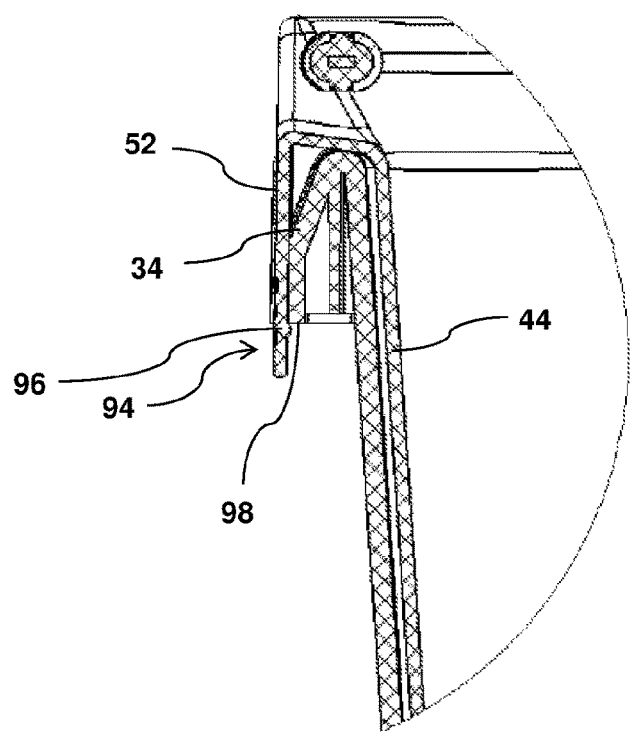
FIG. 26 is an enlarged view of the snap-clip arrangement cross section illustrated in FIG. 25.

FIGS. 24 to 26 exemplify an alternative bucket retention/securing arrangement to the strap arrangement in FIG. 20 and to the hinged clip arrangement illustrated in FIGS. 21-23. With reference to FIG. 24, bucket lip segments 46 are provided with resiliently flexible tabs 94 configured for snap fit engagement with side rim 34. As best illustrated in FIGS. 25 and 26, tabs 94 extend downward from bucket lip retention portions 52 and include a projection 96 extending inwardly toward bucket side wall 44. Projections 96 engage with the downward facing edge 98 of side rim 34 when lip segments 46 are seated upon the tub side rim 34. In this regard, latch projections 96 retain the bucket lip segments 46 upward movement relative to the tub 30.

Figure 27:
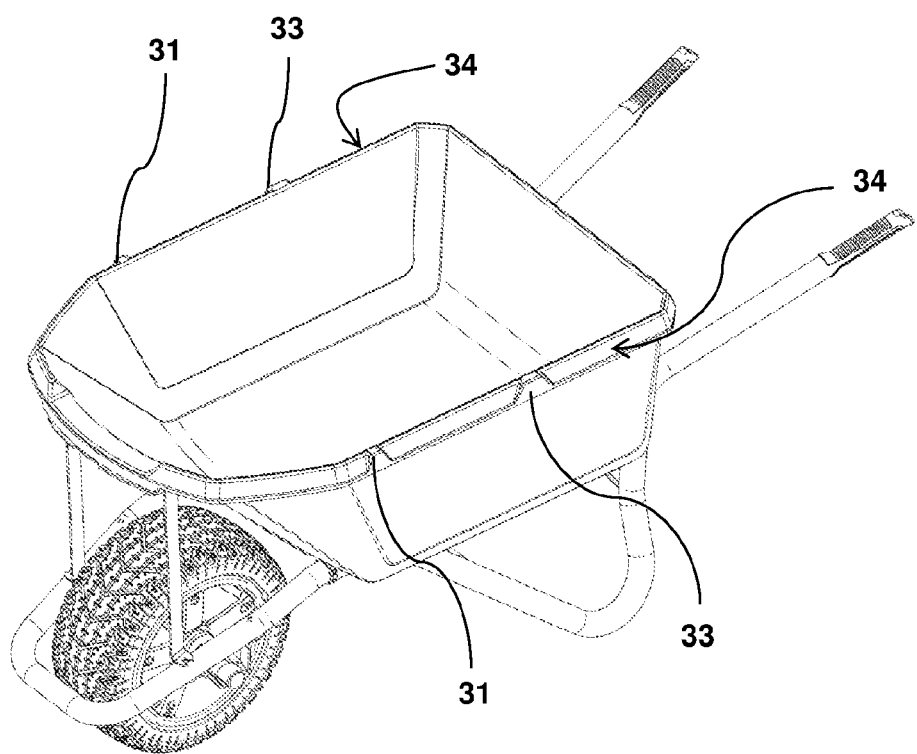
FIG. 27 is a perspective view of a wheelbarrow according to the present invention with all compartments removed and in which a plurality of locating portions are provided in the receptacle rim.

As discussed in the foregoing, the tub rim can include a plurality of locating portions for locating and retaining the buckets in particular position on the tub rim. The locating portions of the present invention are best illustrated in FIGS. 21 and 27. With reference to FIG. 21, the tub rim includes a scoop-bucket locating portion 31 at the abutment point of the scoop and front bucket and a bucket-bucket locating portion 33 at the abutment point of the front bucket and the rear bucket. Scoop-bucket locating portions 31 are shaped to abut, on one side, an edge of the scoop and, on the opposite side, an edge of a bucket. Bucket-bucket locating portions 33 are shaped to abut an edge of a bucket on both sides and are therefore generally symmetrical in profile whilst scoop-bucket locating portions 31 are generally asymmetrical in profile.

FIG. 27 illustrates an embodiment of the present invention in which each tub side rim portion 34 includes a scoop-bucket locating portion 31 and a bucket-bucket locating portion 33. The locating portions comprise a raised rim section and provide a means of locating and retaining the buckets in a desired location on side rim portion 34. Whereas a bucket located on a rim of the tub illustrated in FIG. 6 may (depending on its location) be permitted to slide along the tub rim, a bucket located on the rim of the tub illustrated in FIG. 21 or 27 will generally be prevented from sliding by operation of locating portions 31, 33.

As illustrated in FIGS. 18 and 19, a bucket-bucket locating portion 33 may also be provided on a rear rim portion of the tub rim. In embodiments of the invention in which all compartments are buckets, such as the wheelbarrow illustrated in FIG. 19, all locating portions may be bucket-bucket locating portions 33.

It will be appreciated that the illustrated embodiments of the present invention generally show a tub base/floor or base/floor portions which are generally parallel to the tub rim and each orientated generally horizontally i.e. parallel with the ground surface. However, alternative forms of the present invention may provide a base portion which is sloped or inclined with respect to the tub rim 30. Similarly, the tub base and/or tub rim may be sloped or inclined with respect to the ground surface. As exemplified by wheelbarrow 300 in FIG. 17, some tub according to the present invention may include bases/floors that are horizontal or generally level (for example lower base portion 338) in some areas and sloped/inclined (for example upper base portion 339) in other areas.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The claims defining the invention are as follows:

1. A wheelbarrow including:
    a receptacle comprising a tub for carrying a load of material, the tub being suitable for carrying liquid or particulate material and wherein the tub comprises a peripheral rim having a surface located outside of the tub and a top surface positioned between the tub and the surface;
    a wheel assembly facilitating movement of the wheelbarrow;
    a handle for controlling operation of the wheelbarrow; and
    a plurality of individually removable compartments formed from a solid material and located within the tub, each compartment for containing a portion of the load of material and compartment removal allowing for a portion of the load of material to be carried to and from the tub and each compartment comprises a lip configured to receive the peripheral rim and engage the surface of the peripheral rim of the tub to hinder movement of each compartment relative to the tub,
    wherein the compartments are not connected to one another.

2. The wheelbarrow according to claim 1, wherein the receptacle includes a generally flat floor portion surrounded by a perimeter wall and wherein each of the plurality of compartments is shaped for complementary interaction with the floor portion and the perimeter wall to, in use, hinder movement of each compartment relative to the receptacle.

3. The wheelbarrow according to claim 1, the lip including a downwardly extending retention portion for retaining the lip in a seated position on the receptacle rim.

4. The wheelbarrow according to claim 1, at least one of the compartments being a bucket including a base; a peripheral sidewall and a lip extending from the sidewall for seating on the receptacle rim.

5. The wheelbarrow according to claim 1, the four bucket lip segments defining a generally square or rectangular profile.

6. The wheelbarrow according to claim 1, the receptacle including an inclined sidewall portion and at least one of the compartments being a scoop, shaped to complement the inclined sidewall portion, wherein the scoop includes a lip portion for seating on a rim of the inclined sidewall portion.

7. The wheelbarrow according to claim 6, the inclined sidewall portion being non-linear and the scoop being shaped to complement the inclined non-linear sidewall portion to facilitate nesting of the scoop therein.

8. The wheelbarrow according to claim 6, the receptacle including a non-linear rim portion at an upper end of the non-linear sidewall portion and the scoop including a non-linear lip portion for seating on the non-linear rim portion.

9. The wheelbarrow according to claim 6, the scoop including a rim having a tapered portion.

10. The wheelbarrow according to claim 1, the receptacle including an opening for receiving the plurality of compartments and the plurality of compartments being sized to occupy the total area of the opening.

11. The wheelbarrow according to claim 1, the plurality of compartments being sized to substantially occupy the volume of the receptacle.

12. The wheelbarrow according to claim 1, the receptacle including a securing arrangement to secure the compartments against upward movement, relative to the receptacle.

13. The wheelbarrow according to claim 1, wherein the compartments are suitable for material to be dropped into the compartments from an elevated position.

14. The wheelbarrow according to claim 13 wherein each compartment includes a tapered rim.

15. The wheelbarrow according to claim 1, wherein the peripheral rim is tapered towards an upper portion.

16. The wheelbarrow according to claim 15, wherein the compartment lip comprises a downwardly extending retention portion configured to engage the surface of the tapered peripheral rim located outside of the tub.

17. The wheelbarrow according to claim 1, wherein each compartment comprises a plurality of lip segments located around the periphery of the compartment configured to allow the compartment to seat on the tub rim in a variety of different compartment orientations.

18. The wheelbarrow according to claim 17, wherein the compartments have a four-sided profile and each compartment comprises a lip segment on each of the four compartment sides.

19. The wheelbarrow according to claim 18, wherein adjacent lip segments abut to hinder movement of each compartment relative to other compartments.

20. A wheelbarrow according to claim 1, wherein the compartments are positioned in close proximity to one another so as to minimise material passing between the unconnected compartments.

* * * * *